United States Patent [19]

Hugh

[11] Patent Number: 6,031,537
[45] Date of Patent: Feb. 29, 2000

[54] METHOD AND APPARATUS FOR DISPLAYING A THOUGHT NETWORK FROM A THOUGHT'S PERSPECTIVE

[75] Inventor: Harlan M. Hugh, Los Angeles, Calif.

[73] Assignee: Natrificial LLC, Santa Monica, Calif.

[21] Appl. No.: 08/892,548

[22] Filed: Jul. 14, 1997

Related U.S. Application Data

[63] Continuation-in-part of application No. 08/747,092, Nov. 7, 1996.

[51] Int. Cl.$^7$ ..................................................... G06F 3/00
[52] U.S. Cl. ............................................. 345/357; 345/349
[58] Field of Search ................................... 345/326–358, 345/145, 146

[56] References Cited

U.S. PATENT DOCUMENTS

| | | | |
|---|---|---|---|
| 4,974,173 | 11/1990 | Stefik et al. | 345/331 |
| 5,220,657 | 6/1993 | Bly et al. | 345/329 X |
| 5,459,831 | 10/1995 | Brewer et al. | 345/145 |
| 5,506,937 | 4/1996 | Ford et al. | 395/12 |
| 5,555,354 | 9/1996 | Strasnick et al. | 345/355 X |

FOREIGN PATENT DOCUMENTS

| | | | |
|---|---|---|---|
| 0 273 435 | 7/1988 | European Pat. Off. | G06F 15/40 |
| 0 325 777 | 8/1989 | European Pat. Off. | G06F 11/30 |
| 44 40598 | 5/1996 | Germany | G08F 3/16 |

OTHER PUBLICATIONS

Halasz et al., "NoteCards in a Nutshell", ACM, pp. 45–52, 1987.

Foss, "Tools for Reading and Browsing Hypertext", Information Processing & Management, vol. 25, No. 4, pp. 407–418, 1989.

Carr et al., "Open Information Services", Computer Networks and ISDN Systems, vol. 28, No. 11, pp. 1027–1036, May 1996.

Kent, R.E., et al: "Creating a Web Analysis and Visualization Environment" Computer Networks and ISDN Systems, vol. 1, No. 28, Dec. 1995, p. 109–117, XP004001216.

Olsen, K.A., et al: "Visualization of a Document Collection: The Vibe System" Information Processing and Management (Incorporating Information Technology), vol. 29, No. 1, Jan. 1, 1993, pp. 69–81, XP000574984.

*Primary Examiner*—John E. Breene
*Attorney, Agent, or Firm*—Oppenheimer Wolff & Donnelly LLP; Chien-Wei (Chris) Chou; Claude A.S. Hamrick

[57] ABSTRACT

A method and apparatus for organizing and processing pieces of interrelated information (or "thoughts") is used with a digital computer. The invention employs a graphical user interface to facilitate user interaction with highly flexible, associative "matrices" that enable users conveniently to organize digitally-stored thoughts and their network of interrelationships. Each of the thoughts may be affiliated with one or more application programs, such as a word processing or spreadsheet utility, or an Internet browser. Users are able conveniently to select a current thought along with any applications or content associated with that thought by interacting with the graphical representation. That representation is automatically reoriented about the selected thought, and is revised to reflect only those thoughts having predetermined relations to that current thought. Users can easily modify the matrix by interactively redefining relations between thoughts. Further aspects of the invention include techniques permitting automated generation of thought matrices, delayed loading to facilitate navigation amongst thoughts without undue delay due to bandwidth constraints, and matrix division and linking to allow optimal data structure flexibility. Finally, the present invention is interoperable with computer networks including the Internet, and offers an intuitive scalable methodology for the navigation and management of essentially immeasurable information resources and knowledge bases that transcends the limitations inherent in traditional hierarchical approaches.

36 Claims, 26 Drawing Sheets

```
boolean CheckForIsolation(int centralThought, int targetThought)
{
        // this function checks if centralThought is related to targetThought
        // via any of targetThought's relations (not directly)

// remove centralThought as a direct relation from targetThought
        RemoveRelation(targetThought, centralThought);

// create an empty thought list to keep track of the search
        intList searchList = CreateEmptyList();

// start recursive searches on each of targetThought's direct relations
        int relation = GetFirstRelation(targetThought);
        boolean found;
        do {
                found = Search(relation, centralThought, searchList);
                if(found) {
                        // centralThought was found, no need to search any further
                        break;
                }
                // this loop will end when there are no more relations
        } while(relation = GetNextRelation(targetThought);

// add centralThought back onto target as a relation
        AddRelation(targetThought, centralThought);

return found;

```
boolean Search(source, dest, searchList)
{
        if(Find(source, searchList)) {
                // source has already been searched
                return FALSE;

}

// add source to the searchList
        Add(source, searchList)

if(source == dest) {
                // this is the destination, we have found it
                return TRUE;

}

// recursive searches on each of sources direct relations
        int relation = GetFirstRelation(source);
        boolean found;
        do {
                found = Search(relation, dest, searchList);
                if(found) {
                        // centralThought was found, no need to search any further
                        break;

}
                // this loop will end when there are no more relations
        } while(relation = GetNextRelation(targetThought);

return found;

```
ForgetThought (fNum)
{
  // mark all the children of the selected thought
  list.Clear();
  MarkChildren(fNum, list);
  // unmark the active thought
  list.RemoveThought(activeThought);
  // unmark thoughts with unmarked parents
  lNum = list.GetFirstNum();
  while(lNum !=0)
  {
    if(lNum != fNum)   // don't unmark the selected thought
    {
      pNum = GetFirstThoughtParent(lNum);
      while(pNum != 0)
      {
        if(list.Contains(pNum) == FALSE)
        {
          if(IsThoughtInLongTermMemory(pNum)   == FALSE)
          {
            // unmark all the children of the unmarked parent
            childList.Clear();

MarkChildren(pNum, childList);
            list.RemoveList(childList);
          }
        }
        pNum = GetNextThoughtParent(lNum);
      }
    }
    lNum = list.GetNextNum();
  }
  // now forget all the thoughts left on the list
  lNum = list.GetFirstNum();
  while(lNum != 0)
  {
    ForgetThought(lNum);
    lNum = list.GetNextNum();
  }
}

RememberThought(rNum)
{
  // mark all the children of the selected thought
  list.Clear();
  MarkChildren(rNum, list);
  // remember all the thoughts on the list
  lNum = list.GetFirstNum();
  while(lNum != 0)
  {
    RememberThought(lNum);
    lNum = list.GetNextNum();
  }
}

MarkChildren(num, list)
{
  list.AddThought(num);
  cNum = GetFirstChild(num);
  while(cNum != 0)
  {
    MarkChildren(cNum, list);
    cNum = GetNextChild(num);
  }
}
```

FIG. 17

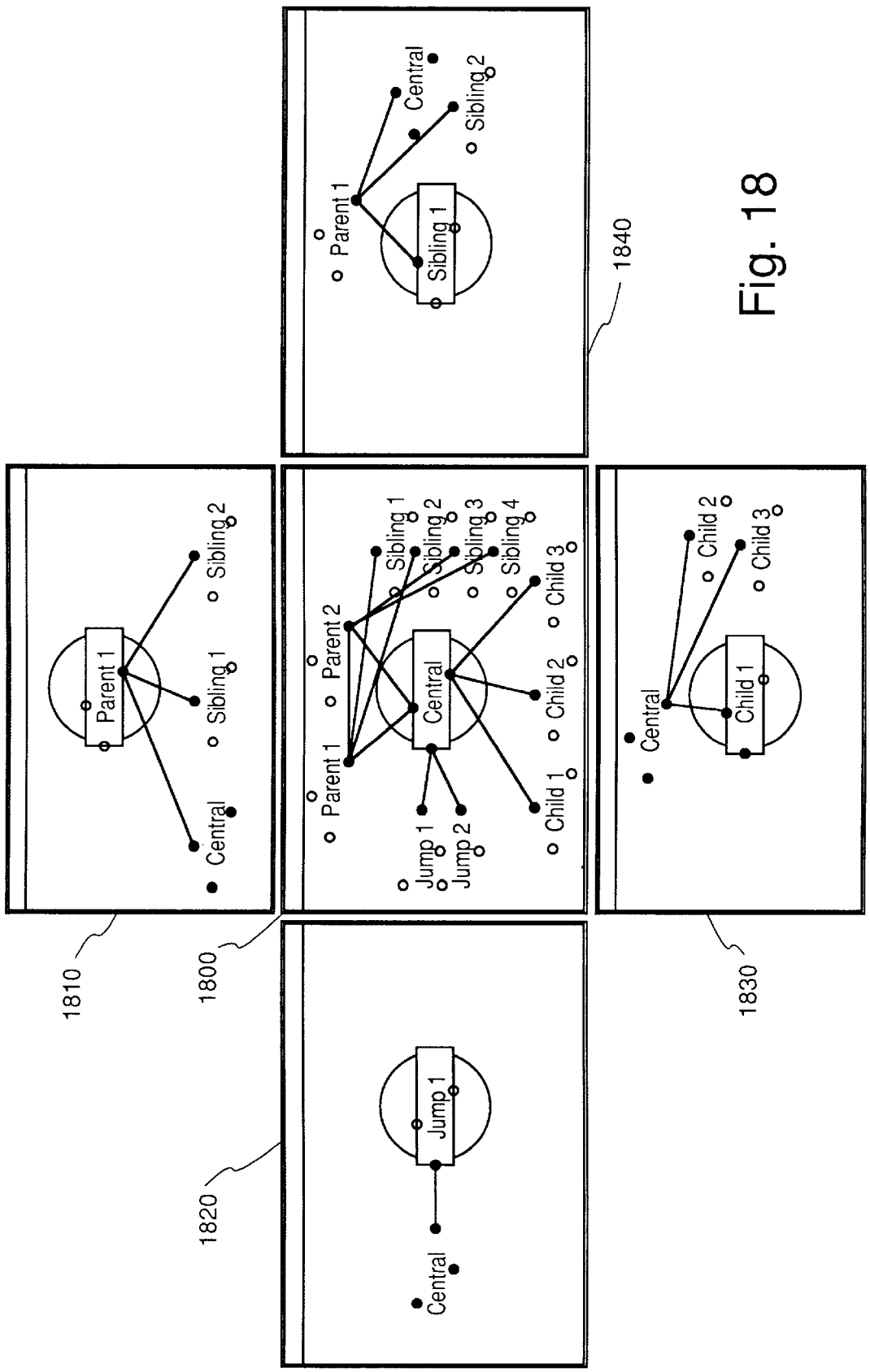

Algorithm for drawing the plex with distant thoughts

1.     Create a list of thoughts to be drawn and their screen locations:
    2.     Add the central thought to the list.
    3.     Add children to the list.
    4.     Add parents to the list.
    5.     Add jumps to the list.
    6.     Add siblings to the list, checking first that they are not already on the list.
    7.     Add distants of children to the list, checking first that they are not already on the list.
    8.     Add distants of parents to the list, checking first that they are not already on the list.
    9.     Add distants of jumps to the list, checking first that they are not already on the list.
    10.     Add distants of siblings to the list, checking first that they are not already on the list.
11.     Draw the lines that connect each thought:
    12.     For each item in the list:
        13.     Get each item in the list:
            14.     If the two items are related, draw lines between them from and to the appropriate gates.
15.     Draw the distant thoughts:
    16.     For each item in the list:
        17.     If it is a distant thought, draw it.
18.     Draw the other thoughts:
    19.     For each item in the list:
        20.     If it is not a distant thought, draw it.

Fig. 23

```
// the non recursive method for searching thoughts
// tries to find a route from nSrc to nDest other than a direct relation
// returns TRUE if found
boolean Search(int nSrc, int nDest)
{
    //create the lists
    ThoughtList posList;     //list of thoughts that possibly connect
    ThoughtList notList;     //list of thoughts that do not connect
    //empty the lists
    posList.Initialize();
    notList.Initialize();

//add the source to the not list since we cannot go directly
    to the destination,
    notList.Add(nSrc);

//since we cannot go directly to the destination,
    //add all relates except the destination to the possible list
    Thought src(nSrc);
    for(int n = 0;;n++)
    {
        int nRel = src.GetRelate(n);
        if(!nRel)
        {
            //no more relations, done
            break;
        }
        if(nRel != nDest)
        {
            //add it to the possibly connect list
            posList.Add(nRel);
        }
    } while(TRUE)
    {
        //check the first possibility
        int nTest = posList.GetFirst();
        if(!nTest)
        {
            //nothing on the list, done
            break;
        }
        Thought test(nTest);
        if(test.IsRelated(nDest))
        {
            //this one is related to the destination, we're done
            return TRUE;
        }
        // does not connect, add it to the does not connect list
        notList.Add(nTest);
        // add all related thoughts except those already checked to
        possible list for
        (int n = 0;; n++)
        {
            int nRel = test.GetRelate(n);
            if(!nRel)
            {
                //no more relations, done
                break;
            }
            if(!notList.Exists(nRel))
            {
                //not checked yet, add to possible list
                posList.Add(rel);
            }
        }
        //remove this one from the possible list
        posList.Remove(nTest);
    }
    //we've checked everything there is no other way to get from
    nSrc to nDest
    return FALSE;
}
```

Fig. 24

METHOD AND APPARATUS FOR DISPLAYING A THOUGHT NETWORK FROM A THOUGHT'S PERSPECTIVE

This application is a continuation-in-part of application Ser. No. 08/747,092, filed Nov. 7, 1996, now pending.

FIELD OF THE INVENTION

This invention relates to methods and apparatus for organizing and processing information, and more particularly, to computer-based graphical user interface-driven methods and apparatus for associative organization and processing of interrelated pieces of information, hereinafter referred to as "thoughts."

BACKGROUND

The general-purpose digital computer is one of the most powerful and remarkable information processing tools ever invented. Indeed, the advent of the digital computer, and the proliferation of a global digital information network known as the Internet, has thrust the world headlong into what is now recognized by many analysts as an "information era" and an "information economy," in which the ability to access and process information in an effective manner is one of the most important forms of economic power.

The potential impact of the digital computer and the Internet on information distribution and processing is undeniably revolutionary. Yet, conventional software environments are generally organized around metaphors and principles from earlier eras. Text-based operating systems like Microsoft ® DOS essentially treat the computer as a giant filing cabinet containing documents and applications. A strictly hierarchical file directory provides a rigid, tree-like structure for this digital file cabinet. Individual documents are the "leaves" of this tree hierarchy. The directory structure generally does not include or express relationships between leaves, and users generally access documents and applications individually, using the directory structure. Even the now ubiquitous graphical "desktop" computing environment, popularized for personal computers by the Apple Macintosh® and Microsoft Windows® operating systems, also simulates a traditional office environment. Individual documents and applications, represented by graphical icons, are displayed on the user's screen, to be accessed one-at-a-time. Once again, a strictly hierarchical, tree-like directory structure is imposed to organize the contents of the desktop.

Although the desktop and file cabinet metaphors have been commercially successful, the limitations and drawbacks of these traditional metaphors become clear when one considers the strikingly different way in which the world's other powerful information processing machine—the human brain—organizes information. Instead of being confined and limited to strictly hierarchical file directory structures, the human brain is thought to interconnect numerous pieces of information through flexible, non-hierarchical, associative networks. As those of skill and experience in the art are aware, it is often clumsy for users of traditional, prior art operating system interfaces to process multiple pieces of information if these pieces are contextually related in some way, but are stored in separate files and/or are associated with different application programs. Too often, the prior art of organizing information lead users to "misplace" information amongst hierarchical categories which often lose their relevance soon after the user creates them. Intended to assist users, traditional hierarchical structures and "desktop" metaphors compel users to organize their thought processes around their computer software, instead of the reverse. The inadequacy of "real-world," hierarchical metaphors for information management was recognized prior to the advent of the computer, but until now has not been successfully remedied.

The recent deluge of digital information bombarding everyday computer users from the Internet only heightens the need for a unified, simple information management method which works in concert with natural thought processes. Additionally, users' ready enthusiasm for the World Wide Web graphical "hypertext" component of the Internet demonstrates the appeal of associative, nonlinear data structures, in contrast to the limiting structure of computerized desktop metaphors. And yet, prior art web browsers and operating systems awkwardly compel users to navigate the associative, non-dimensional structure of the World Wide Web using linear, or at best hierarchical user interfaces.

What is desired is an effective methodology for organizing and processing pieces of interrelated information (or "thoughts") using a digital computer. The methodology should support flexible, associative networks (or "matrices") of digital thoughts, and not be limited to strict, tree hierarchies as are conventional, prior art technologies. A related goal is to create an intuitive and accessible scheme for graphically representing networks of thoughts, providing users with access to diverse types of information in a manner that maximizes access speed but minimizes navigational confusion. Finally, that methodology should be optimized to enable users to seamlessly manage, navigate, and share such matrices consisting of files and content stored both locally on digital information devices, as well as remotely via digital telecommunications networks such as local area networks, wide area networks, and public networks such as the Internet.

SUMMARY OF THE INVENTION

The present invention enables users to organize information on a digital computer in a flexible, associative manner, akin to the way in which information is organized by the human mind. Accordingly, the present invention utilizes highly flexible, associative matrices to organize and represent digitally-stored thoughts. A matrix specifies a plurality of thoughts, as well as network relationships among the thoughts. Because the matrix structure is flexible, each thought may be connected to a plurality of related thoughts. A graphical representation of a portion of the matrix is displayed, including a plurality of user-selectable indicia (such as an icon) corresponding to the thoughts, and in some embodiments, a plurality of connecting lines corresponding to the relationships among the thoughts. Each of the thoughts may be associated with at least one thought document, which itself is associated with a software application program. Users are able to select a current thought conveniently by interacting with the graphical representation, and the current thought is processed by automatically invoking the application program associated with the current thought document in a transparent manner. Upon the selection of a new current thought, the graphical representation of the displayed portion of the matrix (the "plex") is revised to reflect the new current thought, all thoughts having predetermined relations to that current thought, and the relations therebetween. Users can modify the matrix by interactively redrawing the connecting lines between thoughts, and relationships within the matrix are then redefined accordingly. Further aspects of the invention include techniques permitting automated generation of thought matrices, delayed thought loading to facilitate navigation through a plex without undue delay due to bandwidth constraints, and matrix division and linking to allow optimal data structure flexibility. Finally, the present invention is interoperable with digital communications networks including the Internet, and offers an intuitive methodology for the navigation and management of essentially immeasurable information resources that transcends the limitations inherent in traditional hierarchical-based approaches.

BRIEF DESCRIPTION OF THE DRAWINGS

FIG. 10 discloses an algorithm which may be implemented in an embodiment of the present invention.

FIG. 17 sets forth algorithms for implementing forgetting and remembering operations that are used with one embodiment of the present invention.

FIG. 18 depicts five interrelated screen displays of one embodiment of the present invention.

FIG. 23 illustrates a method for drawing a plex having distant thoughts.

FIG. 24 illustrates an alternative algorithm for searching thoughts that may be implemented in an embodiment of the present invention.

NOTATION AND NOMENCLATURE

Figure 1:
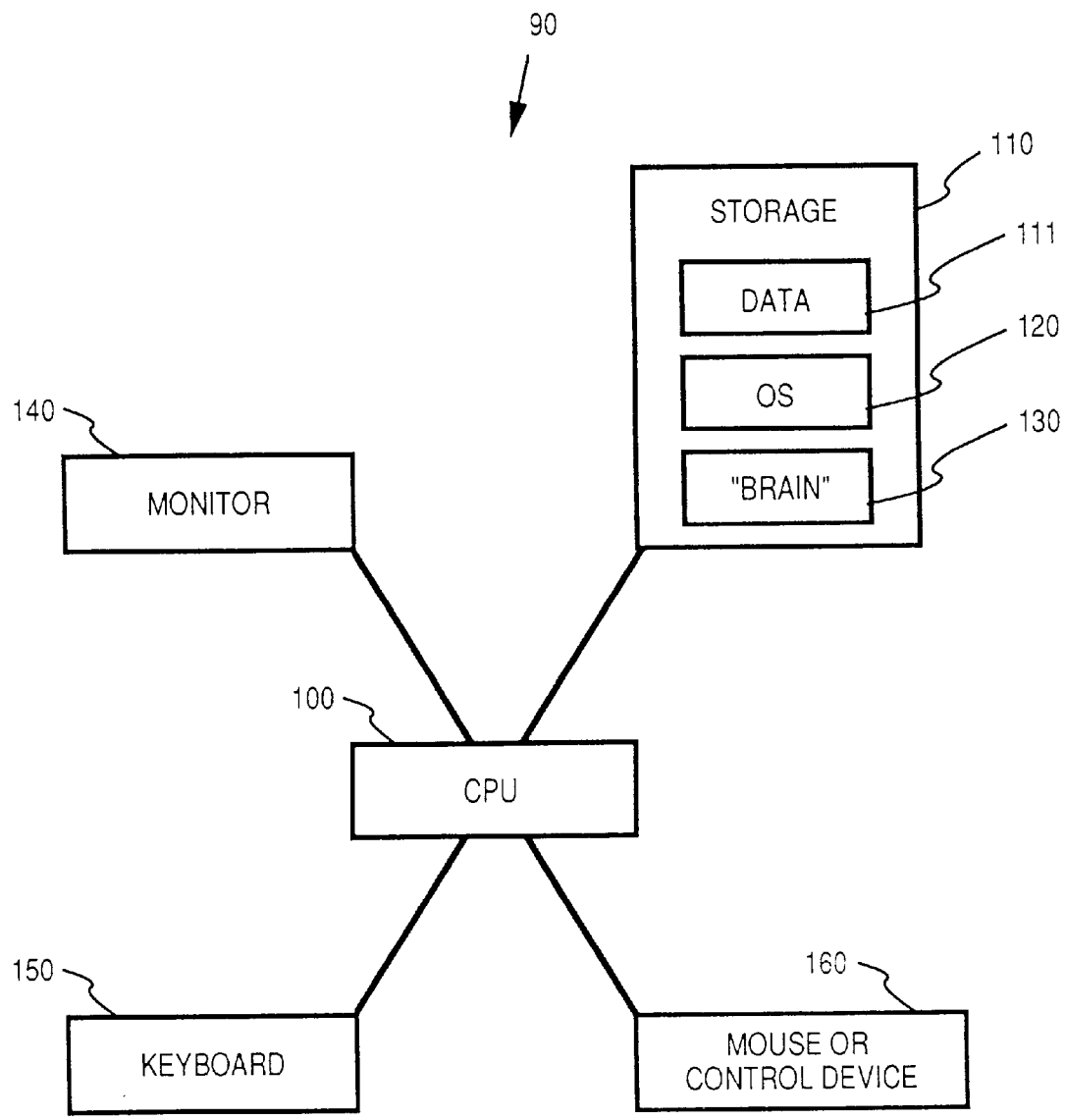
FIG. 1 illustrates the basic architecture of a computer system for use in implementing one embodiment of the present invention.

The detailed descriptions which follow are presented largely in terms of display images, algorithms, and symbolic representations of operations of data bits within a computer memory. These algorithmic descriptions and representations are the means used by those skilled in the data processing arts to most effectively convey the substance of their work to others skilled in the art.

An algorithm is here, and generally, conceived to be a self consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, images, terms, numbers, or the like. It should be borne in mind, however, that all of these and similar terms are to be associated with the appropriate physical quantities and are merely convenient labels applied to these quantities.

In the present case, the operations are machine operations performed in conjunction with a human operator. Useful machines for performing the operations of the present invention include general purpose digital computers or other similar devices. In all cases, there should be borne in mind the distinction between the method operations of operating a computer and the method of computation itself. The present invention relates to method steps for operating a computer and processing electrical or other physical signals to generate other desired physical signals.

The present invention also relates to apparatus for performing these operations. This apparatus may be specially constructed for the required purposes, or it may comprise a general purpose computer selectively activated or reconfigured by a computer program stored in the computer. The algorithms, methods and apparatus presented herein are not inherently related to any particular computer. In particular, various general purpose machines may be used with programs in accordance with the teachings herein, or it may prove more convenient to construct more specialized apparatus to perform the required method steps. The required structure for a variety of these machines will appear from the description given below.

One aspect of the present invention relates to the organization, storage, and retrieval of information with highly-flexible associative data structures, and it is therefore convenient to explain the disclosed processes by analogy to processes commonly associated with human cognition. For example, as explained above, items of information that are processed in accordance with the present invention are referred to by the label "thoughts," and designations such as "forgetting" are used metaphorically to refer to functions or relations relating to the associative data structure of the present invention. These analogies are employed merely to facilitate explanation of the present disclosure. Based on everyday assumptions regarding the way humans think, the distinctions between the presently disclosed computer-implemented invention and actual human cognitive operations must not be overlooked. The interrelations among these thoughts are sometimes similarly defined by reference to genealogically-derived terms such as "parent" and "child" thoughts. In the spirit of the present invention, the assignment of these terms is based largely on human intuition, as they reflect relations between thoughts that may easily be grasped by users not proficient with the use of non-traditional information storage schemes. The terms are merely labels that serve to enhance the clarity of the disclosure. They should not be construed as restricting the flexibility of the described information storage structure. Finally, the term "the Brain" is used in the following disclosure as a label to refer to the methods or apparatus of the present invention. "The Brain" is a trademark of the assignee of this patent application.

DETAILED DESCRIPTION OF THE INVENTION

General System Architecture

FIG. 1 depicts the general architecture of a digital computer system 90 for practicing the present invention. Processor 100 is a standard digital computer microprocessor, such as a CPU of the Intel x86 series. Processor 100 runs system software 120 (such as Microsoft Windows®, Mac OS® or another graphical operating system for personal computers), which is stored on storage unit 110, e.g., a standard internal fixed disk drive. "Brain" software 130, also stored on storage unit 110, includes computer program code for performing the tasks and steps described below, including the digital representation of matrices, the display of graphical representations of such matrices, and the processing of such matrices in accordance with the principles of the present invention. Display output, including the visual graphical user interface ("GUI") discussed below, is transmitted from processor 100 to an output device such as a video monitor 140 for display to users. Users utilize input devices such as standard personal computer keyboard 150, cursor control device 160 (e.g., a mouse or trackball), touch-screen sensors on the monitor display, virtual reality gloves, voice input, or similar techniques to enter the GUI input commands discussed below, which are then transmitted to processor 100. Software for implementing the Brain may be stored in a variety of locations and in a variety of mediums, including without limitation, RAM, data storage 111, a network server, a fixed or portable hard disk drive, an optical disk, or a floppy disk.

Internal Implementation of a Thought

Figure 2:
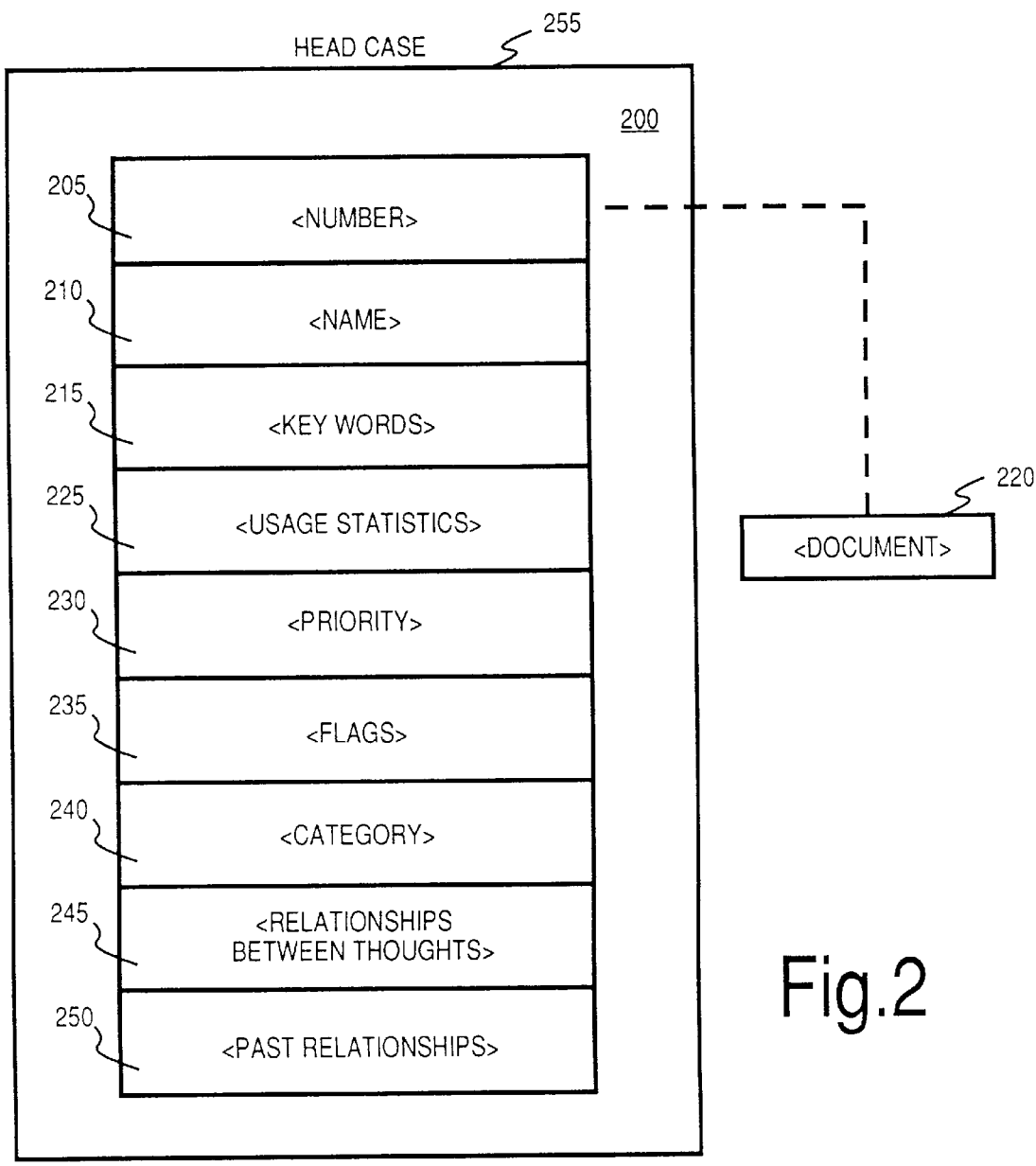
FIG. 2 illustrates one embodiment of the data architecture for thoughts, in accordance with the present invention.

In one embodiment of the present invention as illustrated in FIG. 2, a plurality of interrelated thoughts collectively make up a "thought." Each such thought (i.e., a piece of information, such as a collection of spreadsheet data) is represented internally as comprising various elements, including properties and relationships. Properties can include, as in the example of thought 200: number 205, name 210, key words 215, document 220, usage statistics 225, priority 230, flags 235, category 240. Relationships can include currently linked thoughts 245 and past linked thoughts 250. Except for document 220, all of the data for all thoughts is stored in a set of files 255 (which we designate "the headcase" in one embodiment), which is invisible to the user and is transparently loaded to RAM and saved to data storage 111 as the user works.

Number 205. Each thought has a unique number which, in some embodiments of the present invention, is invisible to the user but is used internally, by other thoughts or lists, to reference the thought. References to each thought thus occupy only a small amount of internal storage, and changes to a thought's user-specified name do not affect internal references.

Name 210. The "name" of a thought is intended to be a brief, textual description of that thought, written by the user. One purpose of a name is to enable users to identify the associated thought in a convenient manner.

Key Words 215. The "key words" of a thought are a list of descriptive terms inputted by the user, which list may be interactively searched using the search methods described in more detail below (see "Searching").

Document 220. Each thought includes an associated "document," which stores all of the specific content for that thought, such as word processing data or spreadsheet data. Each such document is stored internally in its own file in data storage 111 or separately stored in mass storage devices accessible by the computer system.

In some embodiments of the invention, the document name is based on the associated thought's number. In other embodiments, the document name may be based on the name of the associated thought. More particularly, the document name can be the same as the thought name, unless a preexisting file with the identical name already exists. If such a file already exists, the method of the present invention can name the location by appending a number to the name. For some embodiments of the Brain used with operating systems that use filename extensions, the extension for the location may be determined by the thought type in accordance with common practices in the art, for example, ".tht" for thought editor documents, and ".htm" for web pages.

When the name of a thought is changed, the location of the document it references is not changed. This allows the user to use the location to share the file with users who are not using the method of the present invention and therefore must access these files through traditional operating system methods. Of course, a user may edit the location of a document by the same methods used to edit all other thought properties. If the user makes the location point to a nonexistent or unsupported file, the Brain will be unable to edit the document. The referenced file may be either locally or remotely located.

Referenced files may also be used as sources for Microsoft Windows® drag and drop operations known in the art and extensively documented in Windows® Software Development Kits. These operations are capable of exchanging file locations between programs for the purpose of making references, embedding, copying, and pasting. By implementing these operations into the Brain, a user can use the Brain as a drop source. A file stored in the Brain may thereby easily be copied to a Windows Explorer® folder or any other application supporting file drag and drop.

As discussed below, the user need not consciously manage these files. Instead, accessing a thought automatically provides the user with a seamless, transparent way of accessing the document contents, calendar information, notes and other information associated with thought, along with the appropriate application program(s) or utility(ies) for processing those contents.

Usage Statistics 225. "Usage statistics" may be generated and stored for each thought as the user works on that thought, as discussed in greater detail below in the "Additional Features" section.

Priority 230. A priority number set by the user indicates the relative importance of a particular thought. The priority is normally manually set by the user, but can be calculated based upon the usage statistics and the relationships at the user's request. The priority can then be used to filter thoughts when searching or creating thought lists.

Flags 235. Flags provide a mechanism for designating the state of each thought. In one embodiment of the invention, each flag can be in one of three states: on, off, or default. When a flag is in default, the thought value is determined by the category of thought (see Category, below). Flags can be user-defined, or may be automatically provided by the system. One example of a system flag is one that states whether a thought is part of long term memory.

Category 240. A thought's "category" is a number which designates a thought to be of a specific category. Thought categories are defined and named by the user. Each category specifies that thoughts of that category will have certain attributes or "fields," as well as certain default flag values (see the discussion of "flags" above). An example of a category might be "Person," in which case an example field might be "City of Residence." The use of fields to perform indexed searching is discussed in further detail below, in the "Processing Thoughts" section. Category definitions may be stored separately, as templates.

Relationships Between Thoughts 245. In one embodiment of the invention, at least three types of relationships are possible among thoughts: child, parent, and jump. Each thought includes a separate list for each type of relationship. The utility of enabling at least three types of links among thoughts is discussed more fully below. Each such relationship list stores a list of the other thoughts (identified by number) that are related to the instant thought by the instant type of relationship. The relationship lists are used to generate and navigate graphical representations of the matrix, as described in detail below, and are otherwise invisible to the user.

Past Relationships 250. In some embodiments of the invention, there is another set of at least three lists: for child, parent, and jump relationships, respectively, which archive information about those relationships which have been severed or "forgotten" but which may be reattached or remembered upon request by the user. Essentially, this provides a long term memory facility that allows users to recall previous relationships when desired, without cluttering the current display with non-current data, as discussed below.

Graphically Representing and Navigating a Matrix

Figure 3:
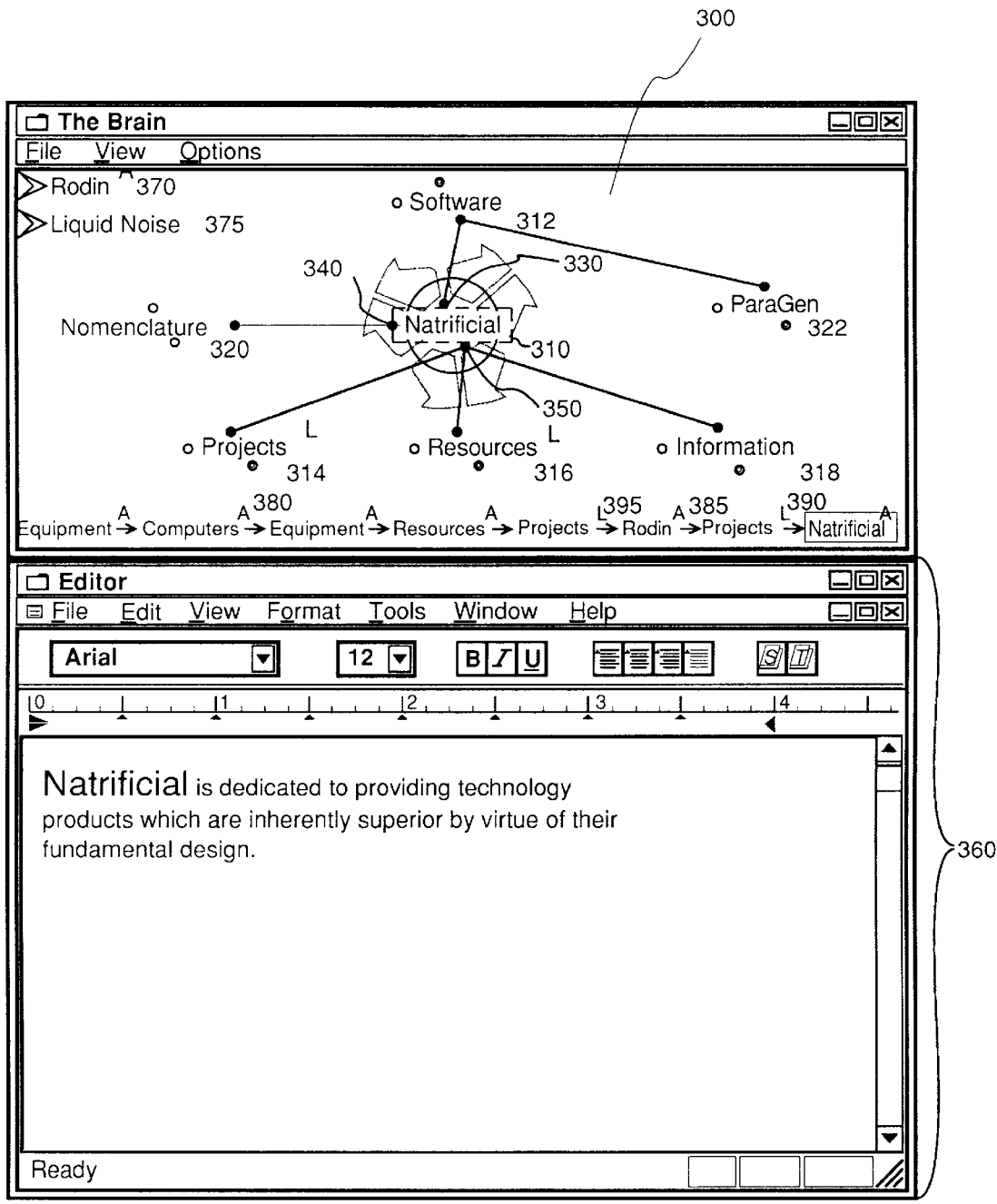
FIG. 3 illustrates a graphical user interface screen display, in accordance with an aspect of the present invention.
Figure 21:
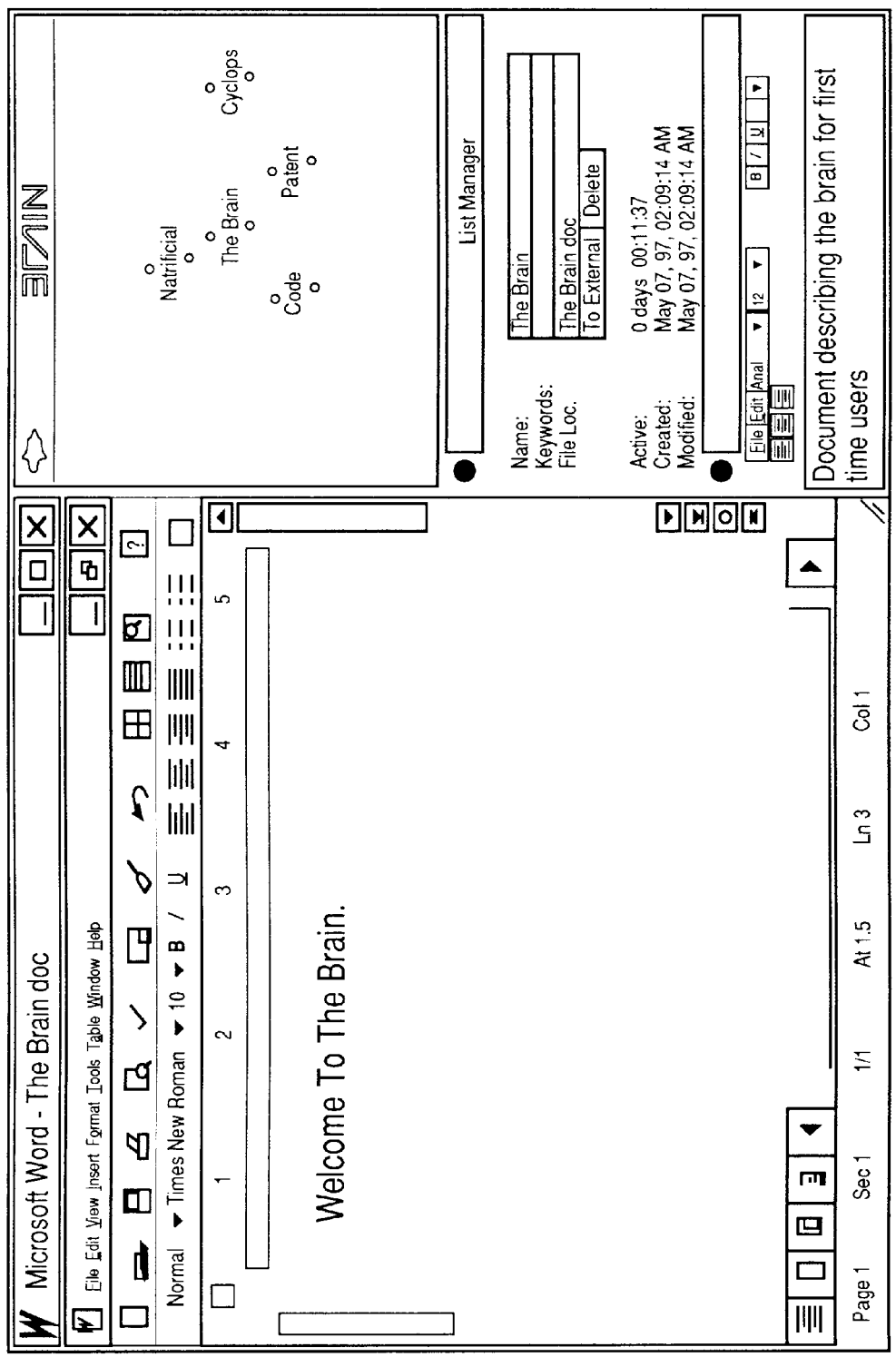
FIG. 21 illustrates an alternative graphical user interface screen display, in accordance with one embodiment of the present invention.

The present invention simultaneously enhances navigational efficiency through its strategic graphical arrangement of display icons representing thoughts. The placement of the thoughts reflects second-level relations that may not be as easily communicated by techniques employing arbitrary thought placement. FIG. 3 illustrates a typical, graphical representation ("plex 300") of a matrix of related thoughts which will be displayed on the monitor 140, in accordance with one embodiment of the present invention. FIG. 21 illustrates an example of an on-screen display of an alternative embodiment of the present invention, in which the plex is displayed in the upper-right-hand section of the screen, the thought document is on the left-hand portion of the screen, and properties, list manager, and notes windows are on the lower right section of the screen.

Thought Types and Interrelation. In the example of FIG. 3, central thought 310 labelled "Natrificial" is displayed in the center of the plex, preferably surrounded by a circle, a dashed rectangle, and a rotating or blinking graphic that visually draws attention to the central thought. Thoughts that are directly related to the central thought 310 are represented in the plex 300 by display icons connected by lines to the central thought. In one embodiment of the present invention, multiple categories or types of thought relationships can be specified, in the interests of providing users maximum organizational flexibility and clarity. Specifically, the present invention allows a plurality of parent thoughts, a plurality of child thoughts, a plurality of sibling thoughts, and a plurality of jump thoughts.

Sibling thoughts (such as the thought "ParaGen" 322), are child thoughts of any and all parent thoughts (such as the thought "Software" 312) of the current central thought ("Natrificial" 310). For example, in the embodiment illustrated in FIG. 3, above the central thought 310 are related parent thoughts. In this plex there is only one, "Software" 312. Below the central thought are child thoughts. In this plex there are three: "Projects" 314, "Resources" 316, and "Information" 318. To the left of the central thought are jump thoughts; in this plex there is only one: "Nomenclature" 320. Finally, to the right of the central thought are sibling thoughts which share a parent with the central thought. In this plex there is only one—"ParaGen" 322. The underlying significance and semantics of these or other categories of thought relationships is entirely unique to the individual practitioner and user. In one embodiment, parent thoughts are displayed in three columns extending upward from the central thought, jump thoughts are displayed in a single column extending upward from the central thought and to the left of the parents, and children are displayed in four columns beneath the central thought and extending downward.

The display of sibling thoughts is not required for navigation through a plex. For this reason, some embodiments of the present invention allow the user to elect in the preferences not to display siblings. Such an election may conserve display space, but will do so at the cost of displaying fewer available thoughts.

Figure 25:
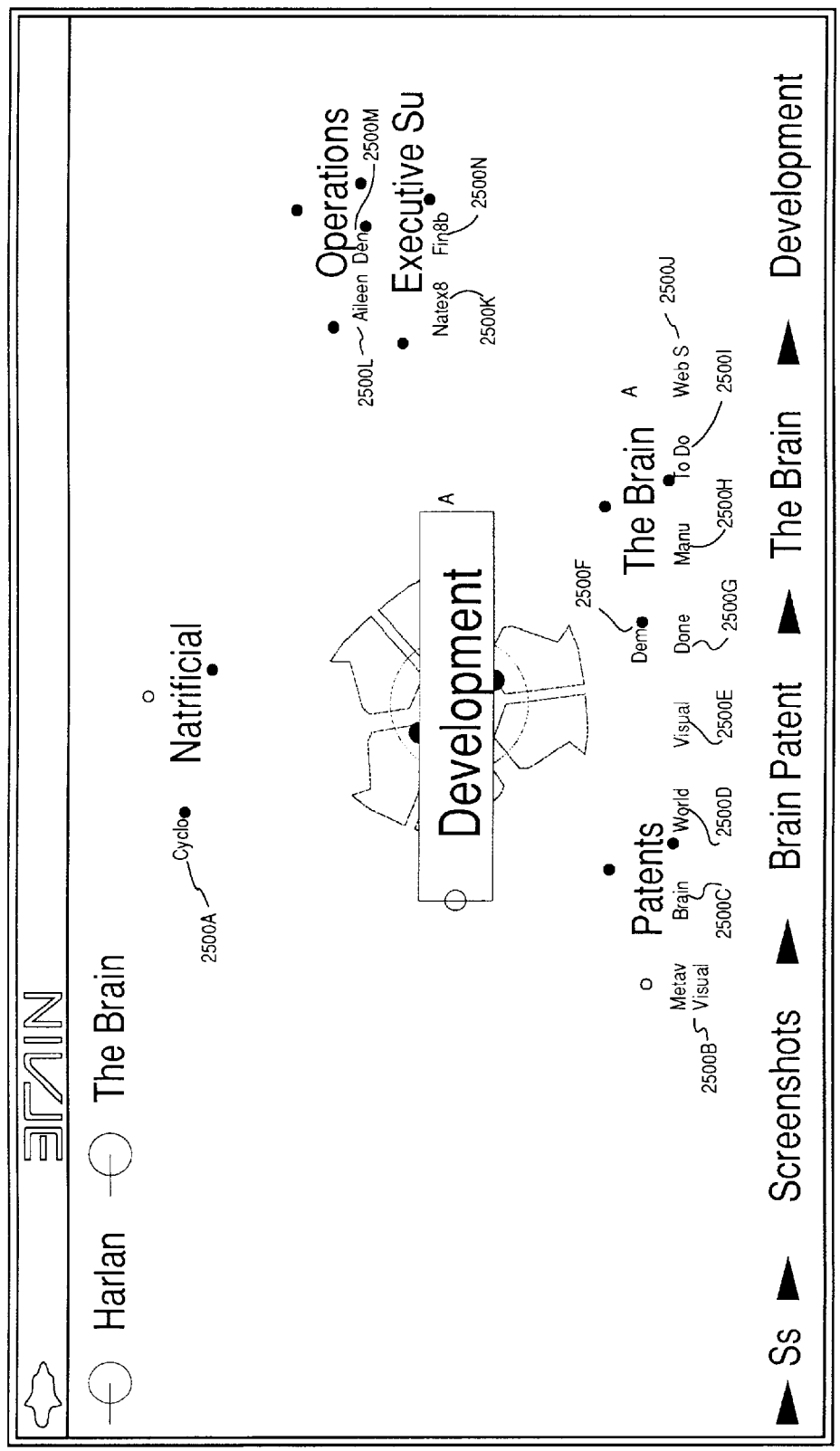
FIG. 25 illustrates a graphical user interface screen.

One embodiment of the invention is configurable in the display preference settings to display other more distantly related thoughts (collectively "distant thoughts"), including grandparents, grandchildren, and partner thoughts. Grandparent thoughts are the parents of the parents, and may be displayed above the parents in two columns extending upward. Grandchildren are the children of the children, and are displayed below the children in four columns extending downward. Partners are the parents of the children, and may be displayed to the left of the active thought and below the jumps. If there are many partners or many jumps, the jumps may be shifted to accommodate the partners. Graphical representations of distant thoughts may be smaller than those for thoughts more directly related to the central thought, and may not contain gates from which relationships may be originated; these distant thoughts can be highlighted as the selection cursor passes over them. One method for graphically representing a plex having distant thoughts is outlined in FIG. 23. As this figure illustrates, this process includes generating a list of thoughts to be drawn and their respective screen locations, drawing connecting lines between these thoughts, and then drawing the thoughts themselves. FIG. 25 is an illustrative screen display having distant thoughts 2500A–N, as described above.

Parent, child and jump thoughts are all equally related insofar as each is directly linked to that central thought. The jump thought is unique in that no thought related to a jump thought is displayed within the plex, unless that thought is itself a parent, child, or sibling of the central thought. Sibling thoughts are secondary relations, connected to the central thought only indirectly through parent thoughts and children thoughts. The distinctions amongst the types of thought relationships can be symbolized within a single plex by displaying lines connecting the thoughts. Those distinctions achieve added significance in the plexes resulting from a user navigating the matrix, activating a different thought as the new central thought. Preserving the distinctions amongst types of thought relationships permits a data management structure which at once lends itself to easy, logical navigation-like hierarchial structures and yet enjoys the dimensionless and unlimited flexibility of a totally associative structure.

The differing relations among thoughts are reflected in the following general rules, which define the collection of thoughts graphically represented in a plex as well as the nature of this representation in some embodiments of the present invention.

Depending upon the defined interrelations between the old central thought and the newly selected central thought, the other thoughts in the old plex may be included or excluded from the new plex. The old central thought, however, will always remain in the new plex. Parent thoughts are related to all of their child thoughts, and child thoughts are related to one another. Therefore, when a child thought is selected, all the other children will remain in the plex as siblings. Likewise, when a parent is selected, the other children of the parent (i.e., some or all of the siblings of the current central thought) will remain in the plex. Furthermore, sibling thoughts are related to each other and their parents, so that when a sibling is selected, all of its siblings (some or all of the siblings of the original central thought) will remain in the plex as siblings.

Jump thought relationships link the jump thought with only the central thought and no other thoughts; therefore, when a jump thought is selected, typically only it and the current central thought will remain in the plex. Non-contextual links such as those inserted into hypertext are effectively the same as jump links, as they do not help to define relationships beyond those that are directly linked. The availability of such non-contextual links within, for example, hypertext documents, expands the breadth and enhances the flexibility of the presently disclosed invention and therefore increases its capacity to provide an optimally intuitive and adjustable structure for organizing information.

Graphical Representation of Matrix. In one embodiment of the invention, each thought in a plex has three circles near it. These circles are thought "gates" (e.g., gates 330, 340, and 350 in FIG. 3), and are used to show and create the relationships between thoughts. The location of each gate tells what kind of relationship it represents. Thus, gate 330 above thought 310 is for relationships to parent thoughts; gate 350 below thought 310 is for relationships to child thoughts; and gate 340 on the side of thought 310 is for relationships to jump thoughts. Note that each thought in the display of FIG. 3 is connected to central thought 310 by the appropriate gate. Each gate circle being used (i.e., a gate through which a thought is connected) may be filled (e.g., gate 330); if no thought is connected through a gate, that gate's circle is empty (e.g., gate 340). In addition, gates may be color-coded according to the currently displayed thoughts. For example, in one embodiment, if a gate is red (e.g., gate 350), this indicates that all the thoughts to which it connects are currently displayed. If a gate is green (e.g., gate 365), this indicates that there are other thoughts to which it is connected and which are not displayed within the plex at this time.

Display of the plex may be configured based upon the current thought. More specifically, the display positions of thoughts are determined by the way they are related and the number of thoughts that are related in that way. Thus, in one embodiment, the central thought (e.g., 310) is always drawn in the center. Above the central thought are the parent thoughts (e.g., 312), which are drawn in up to two columns extending upward. Below the central thought are the child thoughts (e.g., 314, 316, 318), which are drawn in up to four columns extending downward. The jump thoughts appear to the left in a single column which extends up and down until it hits the child thoughts, at which point it begins to extend only upward. Sibling thoughts appear to the right of the central thought in a single column which extends up and down until it hits the child thoughts, at which point it begins to extend only upward. In practice, the actual drawing sequence on screen may be performed as follows. First the background is cleared. The scaling circle and the lines that connect the thoughts are then drawn. Next, the lines are drawn between the locations of the gates representing the appropriate relationships. Finally, the actual thought names and the gates are drawn.

Occasionally a central thought will be linked to so many thoughts that it will be impossible to simultaneously display all thoughts in a plex. In one embodiment of the present invention, the Brain will display arrows above and/or below thoughts with particular relations to thoughts that could not be accommodated on the display. By clicking on or dragging these arrows, the user may scroll through the entire list of thoughts. When second-level thoughts are displayed, only those which are linked to the thoughts displayed will be displayed.

Figure 4:
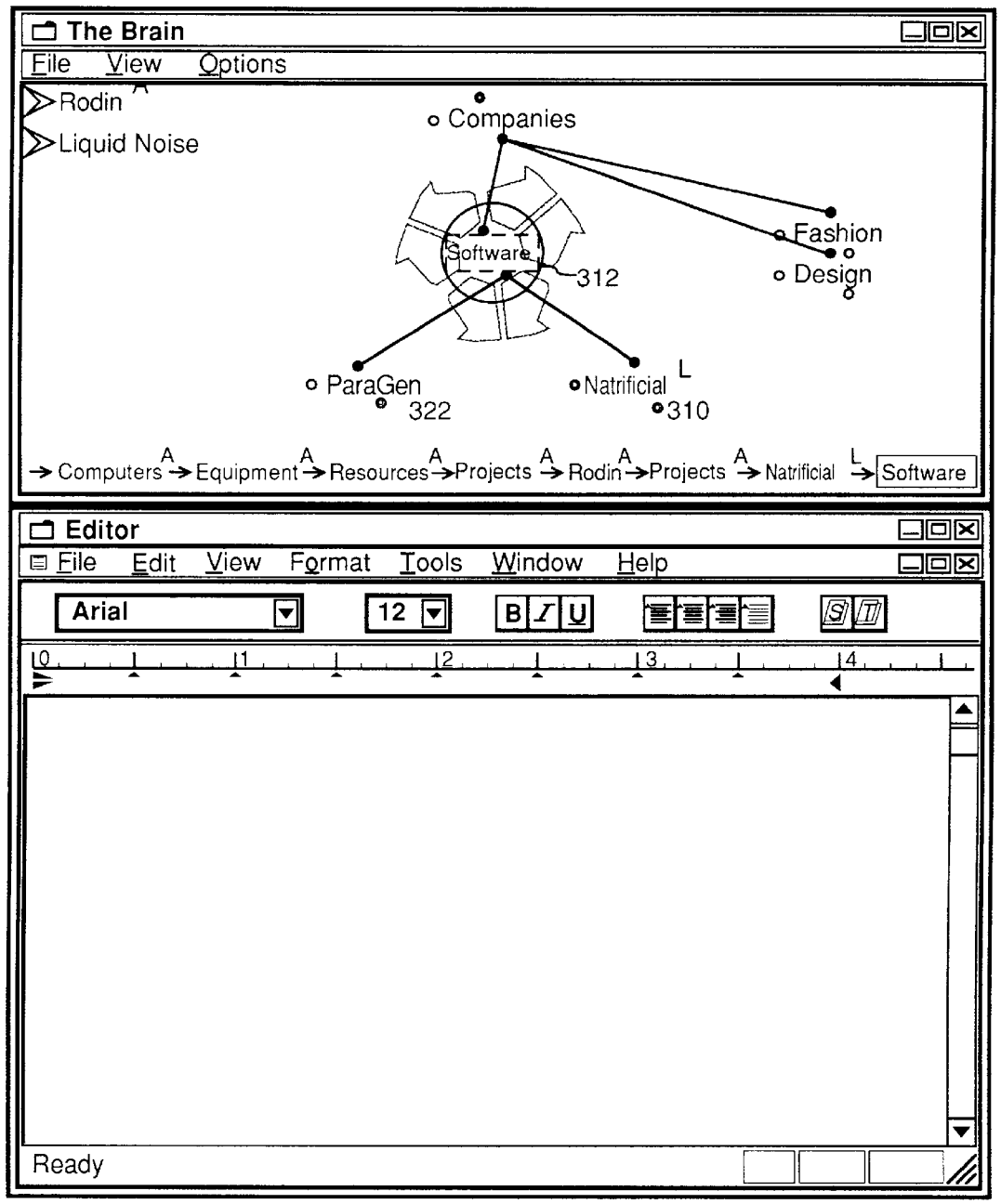
FIG. 4 illustrates the graphical user interface of FIG. 3, reflecting the selection of a new current thought by a user.

Matrix Navigation. Navigation and movement through the matrix is accomplished by selecting the thought to be moved to, using control device 160 or keyboard 150. In one embodiment, navigation is accomplished by selecting a thought indicium with a cursor control device such as a mouse. When a thought in the plex is selected to become the new central thought, the plex is rearranged according to the links associated with the newly selected central thought. In some embodiments, this process may be graphically reflected with animation showing the movement of the thoughts. For example, FIG. 4 shows the plex of FIG. 3, but rearranged after a user has interactively selected Software 312 as the new central thought, in place of Natrificial 310. Window 360 is used to display and edit the document for the current thought, as discussed below in the section entitled "Processing Thoughts."

One method of navigation using a keyboard utilizes the arrow keys in connection with other keys. In one particular embodiment, thoughts may be activated using a combination of the [Alt] key and the arrow keys. Upon the depression of the [Alt] key, a cursor is initially displayed over the central thought. Subsequent depression of the [Up] key may move the cursor to the closest parent, [Down] to the closest child, and so on. Within a group of thoughts, the arrow keys can be used to move the cursor among the group. The [Left] key may be assigned to return to the central thought from the siblings, and the [Right] may be assigned to return to the central thought from the jumps. The [Down] key will only return to the central thought from the parents if the cursor is over the bottom parent thought. The [Up] key will only return to the central thought from the children if the cursor is over the top child thought. If the display includes scrollbars, the [Up] and [Down] keys may be used to scroll. A selected thought may then be activated by the release of the [Alt] key, or in another embodiment, the [Alt] key may be pressed once to begin a thought selection routine and a second time to activate a selected thought.

Navigation Example. FIG. 18 illustrates five related screen displays of one embodiment of the Brain. These connected displays demonstrate the practical significance of the novel interrelations among the different types of thought relationships of the present invention. Specifically, using differentiated types of thought relationships enhances the relevancy of the plex, by displaying only the most interrelated thoughts. The center screen 1800 illustrates a hypothetical plex, and each of the four screens bordering this hypothetical plex 1810, 1820, 1830, and 1840 illustrates the plex that would be displayed upon the user's selection of a particular one of the thoughts from the original hypothetical plex to be the central thought. As FIG. 18 shows, the original plex 1800 comprises a central thought ("Central") in the center of the plex, surrounded by and connected to a multiplicity of jump, parent, sibling, and child thoughts. For simplicity, this example presumes that, contrary to thoughts in a typical plex, none of the thoughts in the original plex are connected to any thought outside the original plex, and that each thought is connected to that central thought by only one type of thought relationship. Also for simplicity's sake, FIG. 18 assumes that sibling thoughts are the only indirect thought relationships displayed, and that the illustrated embodiment will not display distant thoughts.

The screen 1810 above the original plex illustrates the plex that would result if the user selected the "Parent 1" thought from the original plex. As FIG. 18 illustrates, the Parent 1 thought in the original plex was connected only to the central thought and to the thoughts labeled Sibling 1 and Sibling 2. Upon the selection of "Parent 1" from the original plex, the Parent 1 thought moves to the center of the plex display, and the thoughts linked thereto move accordingly into position around the Parent 1 thought. The names assigned to the thoughts in each of the five screens are based on the position of the thoughts in the original (center) plex, and were not changed so that one could follow the movement of each thought from the original plex to each of the peripheral plexes. Therefore, Sibling 1 and Sibling 2, which were siblings of the original central thought and therefore were displayed on the right-hand side of the plex, move into position under Parent 1 in the top plex because Sibling 1 and Sibling 2 are children of Parent 1 (the new central thought). As explained above, children thoughts are displayed at the bottom of the plex. The original central thought, labeled "Central," is also a child of Parent 1 and therefore is also displayed below Parent 1. Jump 1 and Jump 2 were related only to the central thought within the original plex, are not directly related to Parent 1, and are therefore not displayed within the new plex. Child 1, Child 2 and Child 3 are now grandchildren and are not displayed. Neither is Parent 2 which is now a partner, nor Siblings 3 and 4 which are related to Parent 1 only through three thought relationship links ("links").

The plex 1840 to the right of the original plex 1800 is the plex that would result upon the selection of Sibling 1 as the new central thought. Specifically, as shown in the original (center) plex, Sibling 1 is directly connected only to Parent 1. Therefore, the new plex shows Sibling 1 as the new central thought, with Parent 1 (Sibling 1's parent) connected above. Furthermore, because Sibling 1, Sibling 2 and Central share Parent 1 as a common parent, they are siblings of one another. Sibling 2 and Central are displayed as sibling thoughts to the right of Sibling 1 in the new plex. Again, Jump 1 and Jump 2 were related only to the central thought within the original plex, are not directly related to Sibling 1, and are therefore not displayed within the new plex. Child 1, Child 2 and Child 3, Parent 2, Sibling 3, and Sibling 4 are not displayed because each is at least three links removed.

The plex 1830 below the original plex 1800 is the plex that would result upon the selection of Child 1 as the new central thought. Specifically, as shown in the original (center) plex, Child 1 is directly connected only to the original central thought. Therefore, the new plex includes Child 1 as the new central thought and includes the original central thought as a parent thought displayed above Child 1 (because Child 1 is a child of Central, Central is a parent of Child 1). Furthermore, as the original plex shows, Child 1, Child 2, and Child 3 share Central as a common parent and therefore are all siblings. Thus, Child 2 and Child 3 are displayed as siblings of Child 1 on the right-hand side of the plex. Again, Jump 1 and Jump 2 were related only to the central thought within the original plex, are not related to Child 1, and are therefore not displayed within the new plex. Parents 1 and 2 would now be grandparents and are not displayed. Neither are Siblings 1, 2, 3 and 4 which are at least three links removed from Child 1.

The plex 1820 to the left of the original plex 1800 is the plex that would result upon the selection of Jump 1 as the new central thought. Specifically, as shown in the original (center) plex, Jump 1 is directly connected only to the original central thought, and is not directly related to any other thoughts in the original plex. Therefore, the resulting plex includes only Jump 1 as the new central thought and Central as a jump thought.

Advantages of Associative Interrelations. As this example graphically illustrates, the relatedness of particular thoughts is reflected in the manner in which those thoughts are displayed as the user navigates the matrix. By choosing one type of link over another, the user has the power to affect the content of the plexes that are displayed upon the selection of any thought from the current plex as the new central thought. The method of the present invention utilizes intuitively-derived thought interrelations and graphical representations to optimize the benefits human users will obtain from the Brain. Harnessing this power offers the user informational displays that are as or more relevant than hierarchical displays, yet free of the artificial spatial limitations inherent in hierarchies and "real world" metaphors.

Figure 19:
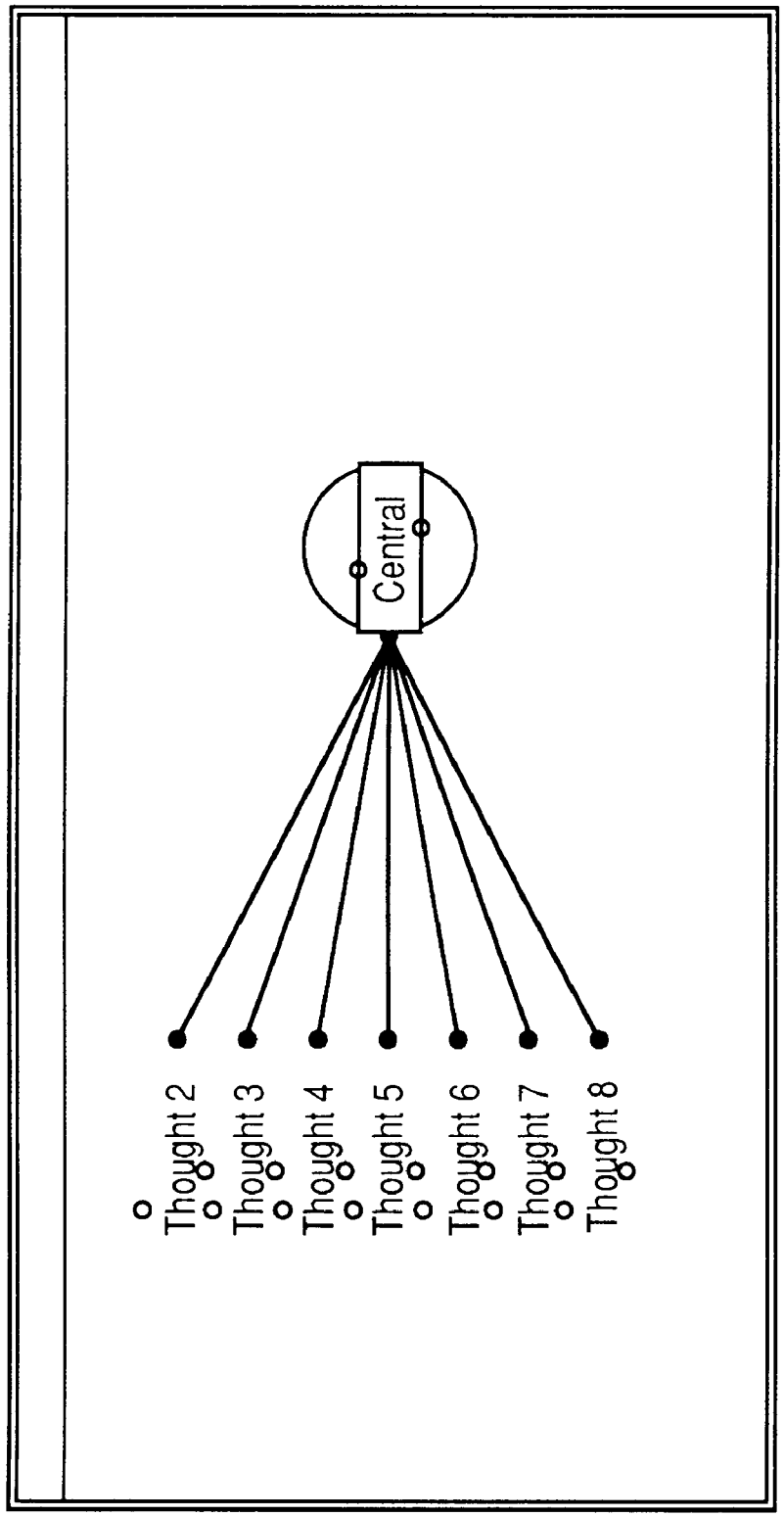
FIG. 19 illustrates a hypothetical screen display of an information storage arrangement having non-differentiated links.
Figure 20:
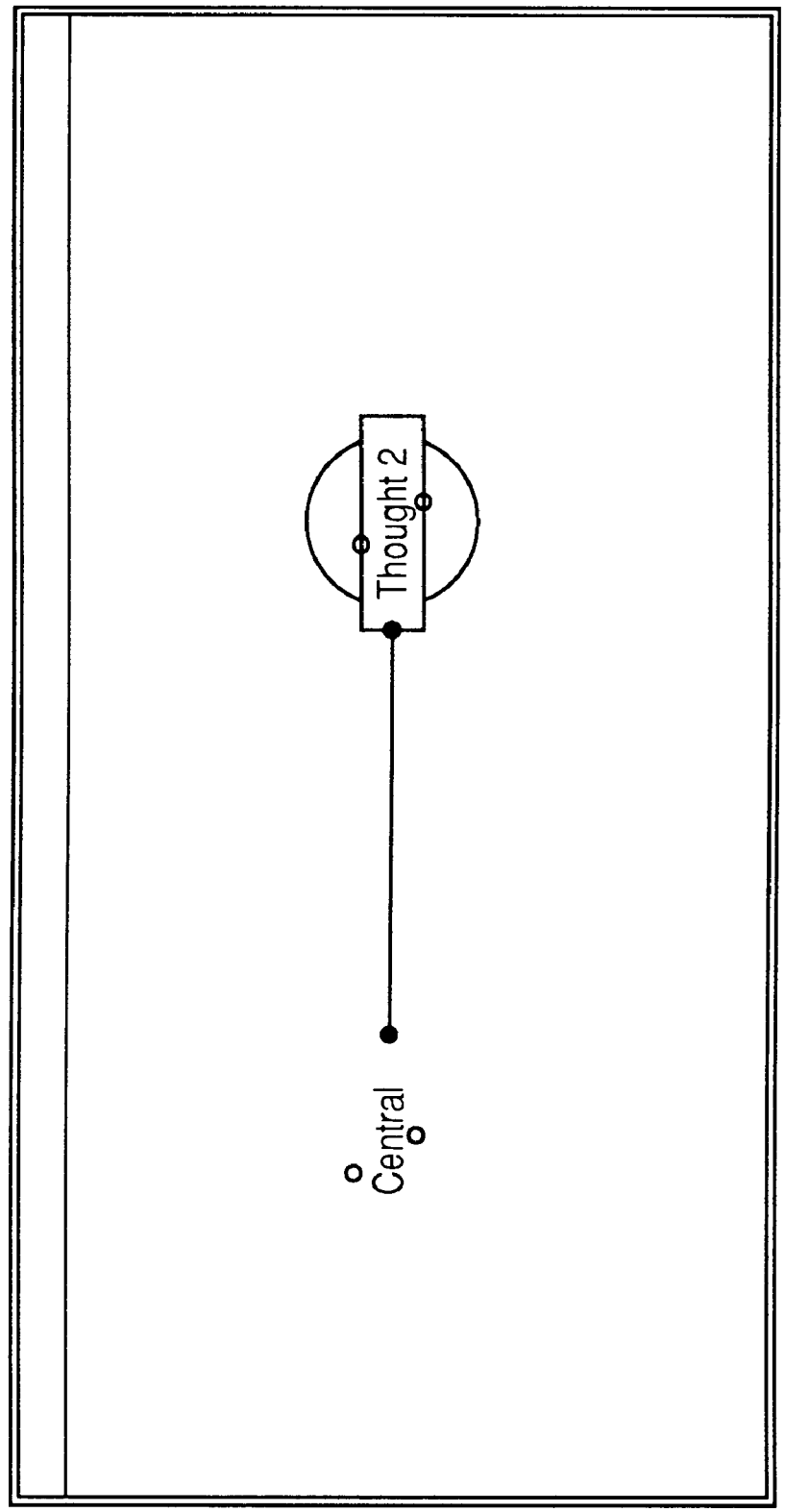
FIG. 20 illustrates the screen display that would result upon the selection of an element from the hypothetical screen display of FIG. 19.

These advantages become particularly clear when the interface and storage structure of the present invention are contrasted against a system having nondifferentiated links. A hypothetical screen display of such a system is shown in FIG. 19. This display is one possible representation of a central thought related to eight other thoughts. However, no information about the nature of this interrelation may be gleaned by the graphical representation of FIG. 19. The inherent limitations of systems capable of only a single type of association are strikingly apparent when one considers the plex that would result upon the selection of one of the thoughts depicted in FIG. 19. As FIG. 20 illustrates, the plex resulting from the selection of a thought from the hypothetical plex of FIG. 19 would contain only two individual thoughts connected by a single nondifferentiated link. The present invention overcomes these deficiencies and allows an optimally flexible, intuitive, and therefore efficient means for organizing information.

Defining a Matrix

Figure 5:
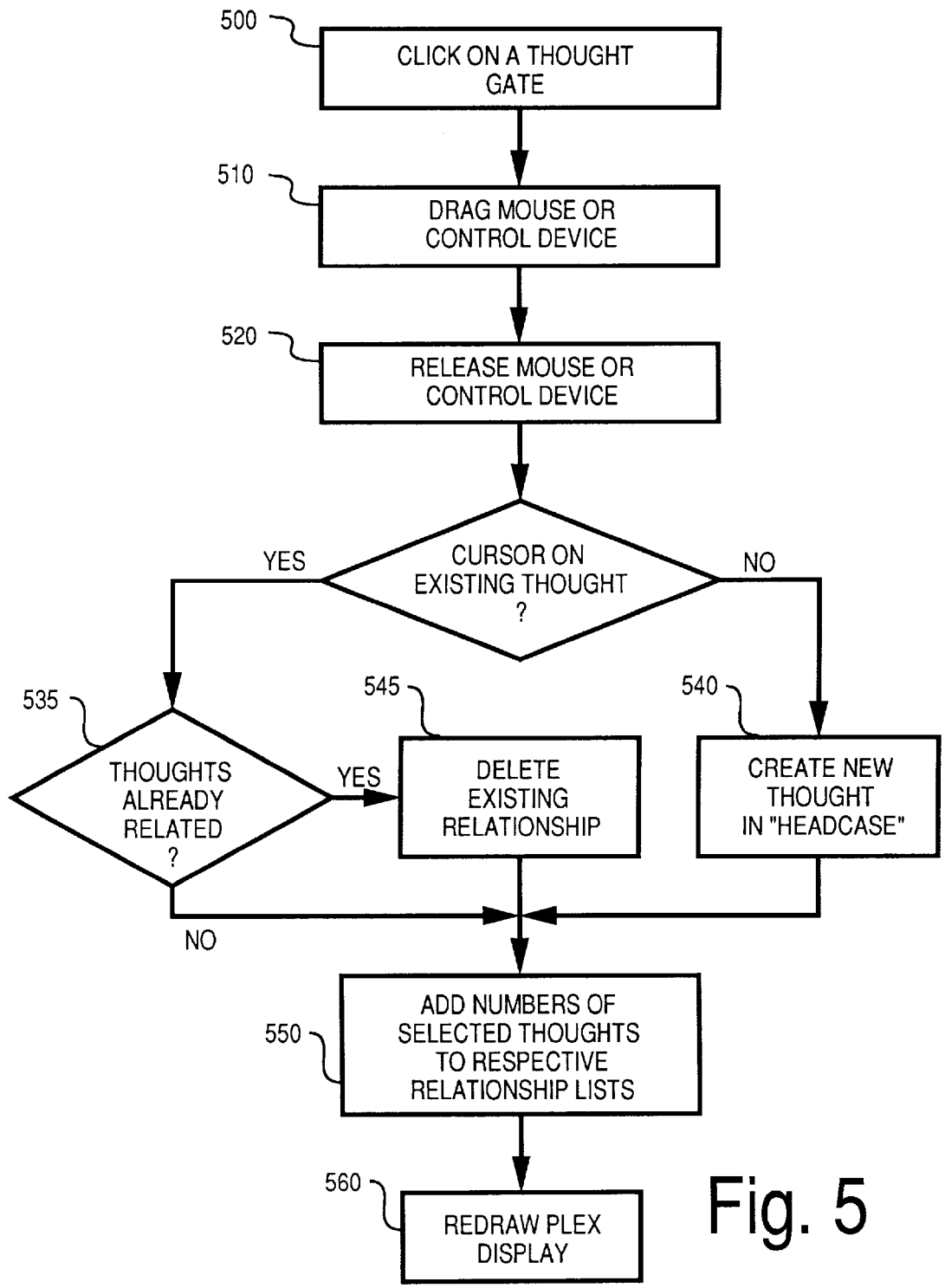
FIG. 5 is a flow diagram showing the process for creating and relating thoughts in an embodiment of the present invention.
Figure 7:
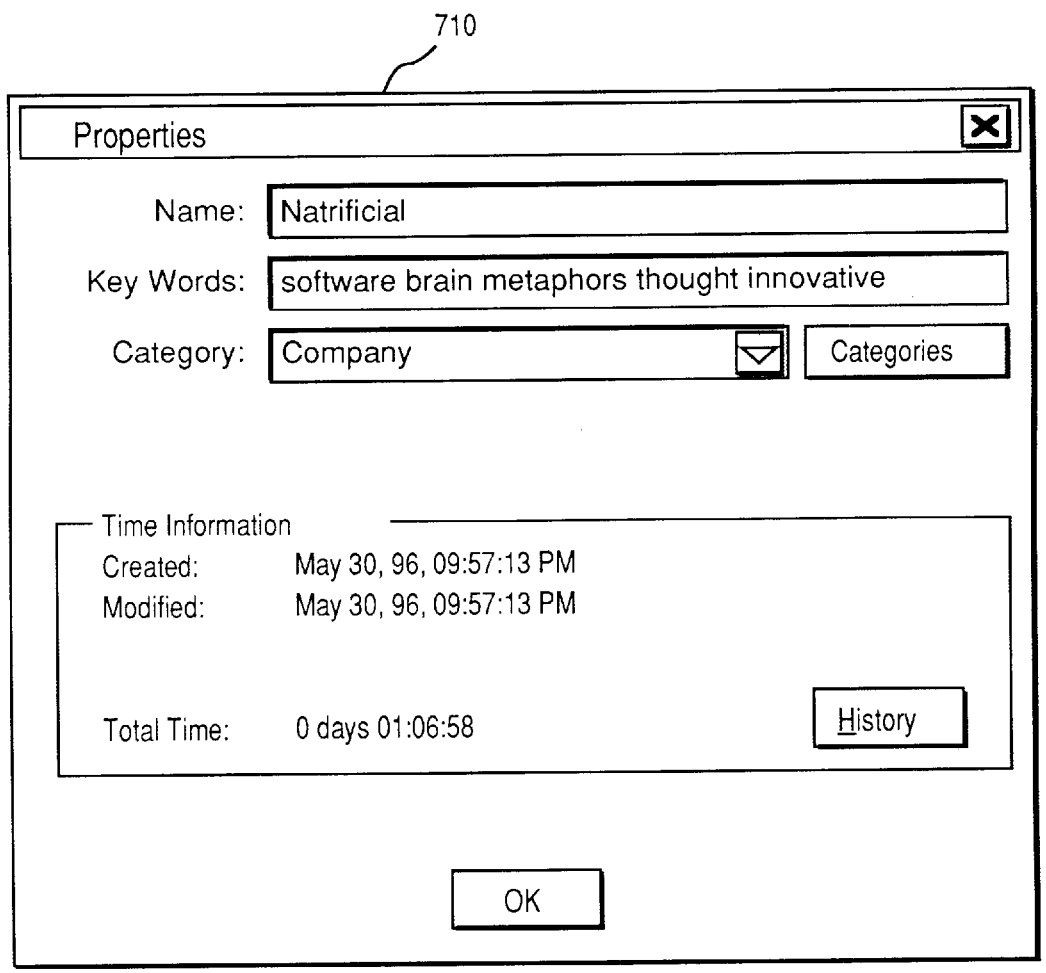
FIG. 7 illustrates a graphical user interface screen display, in accordance with another aspect of the present invention.

Creating New Thoughts. New thoughts may be created by interactively clicking and dragging, using mouse/control device 160, from any of the gates around an existing thought. FIG. 5 provides a flow diagram showing the basic steps of this process. At step 500, the user selects by clicking on a gate of an existing thought (a "source thought"), to which the new thought is to be related. At step 510, the user drags control device 160 away from the source thought; during this step, a "rubber-band" line may be displayed coming out of the source thought gate and tracking the cursor controlled by mouse/control device 160. At step 520, the mouse/control device's 160 button is released. At that point, if the cursor controlled by mouse/control device 160 is located over an existing thought (a "target thought"), as indicated at decision point 530, then the system assumes the user desires to create a new relationship between the source thought and the target thought, as will be described shortly below. In order to create a new thought, the user simply releases mouse/control device 160 with the cursor at an unoccupied location on the screen. In that case, as shown at step 540, a new thought is created and added to headcase 290. In one embodiment, a dialog box 710 (see FIG. 7) appears and asks for the new thought's name and/or other properties; a unique new thought number is created to refer to this thought; all of the new thought's data fields are initialized to default values; and the thought's number is added to a global list of all thoughts. At this time a user may specify a plurality of thoughts to be linked in the same manner. The Brain can automatically link preexisting thoughts specified at this time.

Next, at step 550, a relationship is created between the source thought and the new thought, based in some embodiments upon the type of gate of the source thought that was selected at step 500. In particular, the new thought's number is added to the appropriate relationship list (245) of the source thought, and the source thought's number is added to the appropriate relationship list (245) of the new thought. Finally, at step 560, the updated plex is redrawn, reflecting the newly created thought and its relationship to the source thought.

Relating Existing Thoughts. Existing thoughts may be related using the same method as is used to create new thoughts. Referring again to FIG. 5, steps 500 through 520 are the same. However, at decision point 530, control device is determined to have been released with the cursor located over an existing thought (the "target thought"). In that case, at step 535, the relationship list 245 (FIG. 2) of the source thought and target thought are checked to ensure that the thoughts are not already directly related. If such a relationship does exist, it may be deleted at step 545 by removing the source and target thoughts' numbers from each other's current relationship lists, to avoid any ambiguities. Next, at step 550, the source and target thoughts' numbers are added to each other's appropriate relationship list (245), as determined by the source thought's gate type originally selected at step 500. The redefined matrix is redrawn at step 560. If such a relationship does not exist, then step 545 is inapplicable and step 550 is processed immediately after step 535 is executed.

Figure 8:
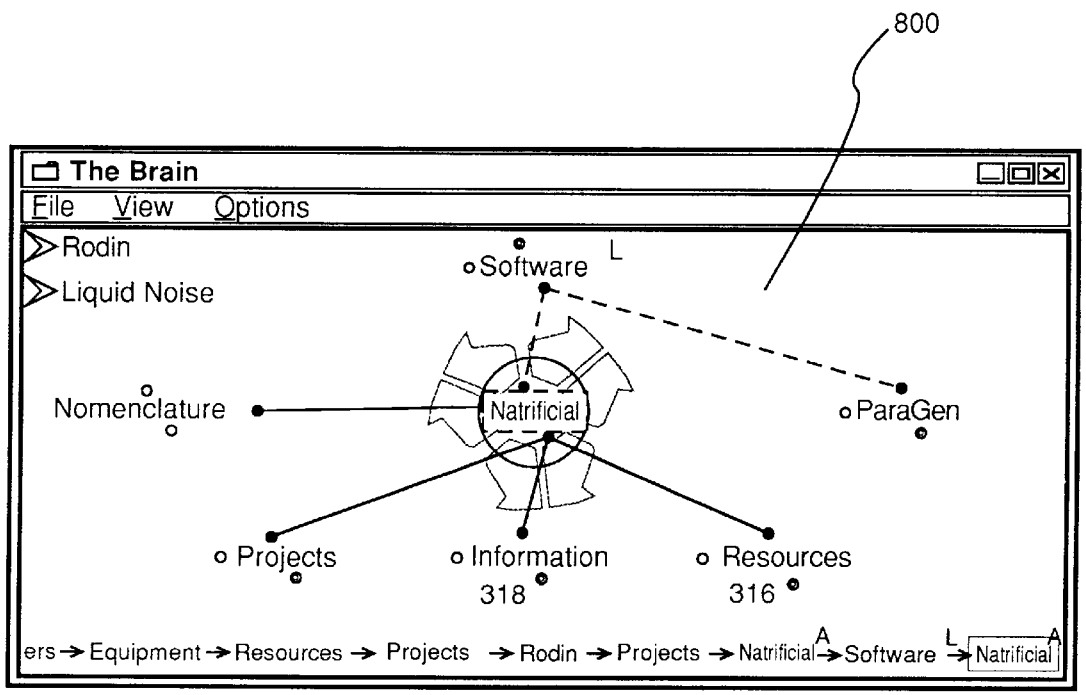
FIG. 8 illustrates a graphical user interface screen display, in accordance with another aspect of the present invention.

Reordering Relations. Related thoughts are drawn in the plex according to the order they are listed in the relationships list of the central thought. By dragging the thoughts in the display, the user can specify in what order they should be listed and as a result, where they will appear. In reference to FIG. 3, FIG. 8 provides an example of the display 800, in one embodiment, which would result if a user were to interactively reverse the order of thoughts 316 and 318, causing the icons representing those thoughts 316 and 318 to switch horizontal positions as demonstrated by the positions of those thoughts 316 and 318 in FIG. 8 or if a digital computer were to reorder those thoughts based upon an alphanumeric sequence, usage statistics, or other logical criteria.

Figure 6:
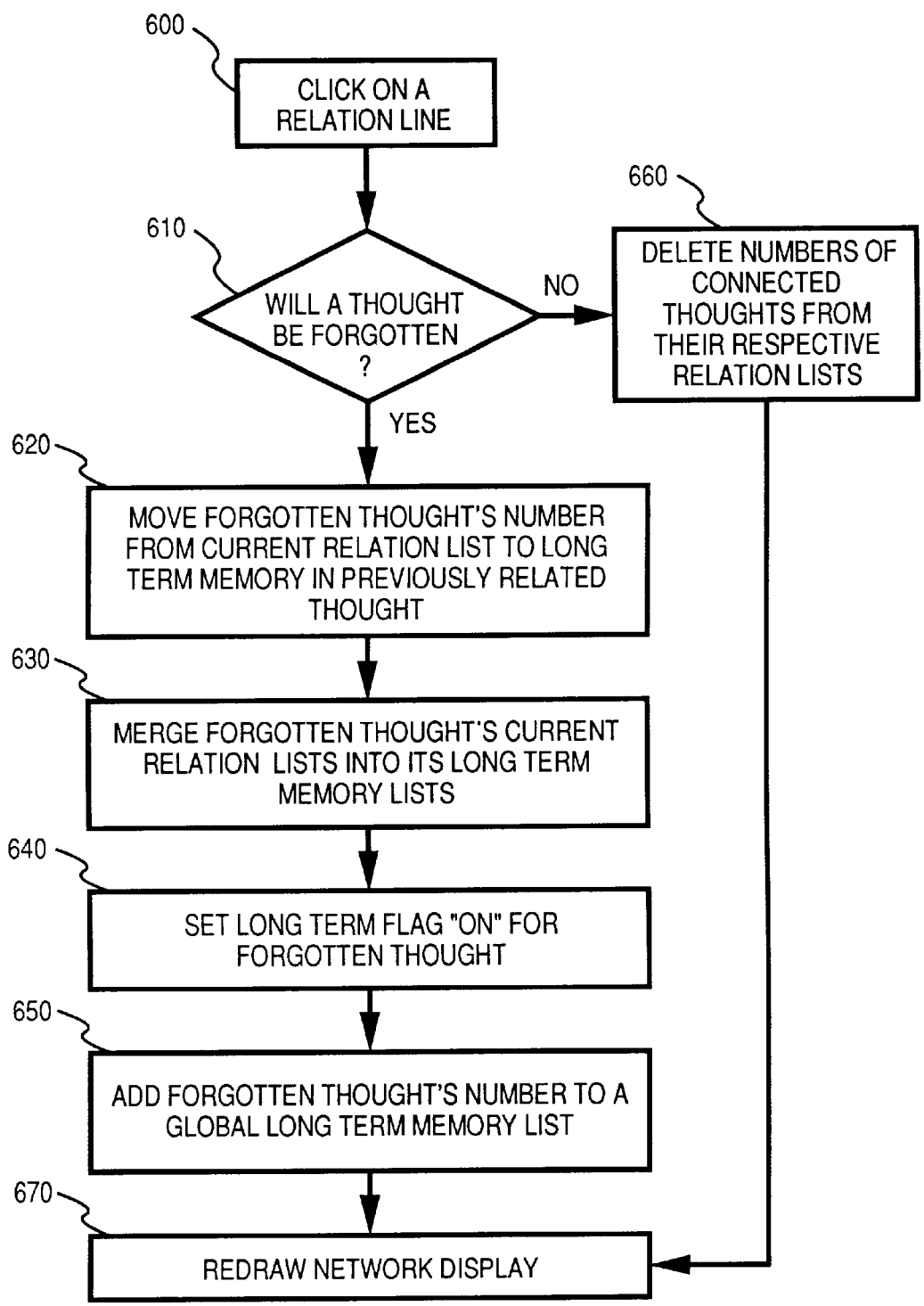
FIG. 6 is a flow diagram showing the process for severing relationships between thoughts in an embodiment of the present invention.

Severing Relations Between Existing Thoughts. It is possible to sever the relationship between two existing thoughts, such as central thought 310 ("Natrificial") and child thought 314 ("Projects"), using a process similar to the process used to define a new relationship between existing thoughts. As the flow diagram in FIG. 6 outlines, at step 600, the user requests that a particular relationship be severed by clicking on the lines which connect two thoughts such as the line connecting thoughts 310 and 314 in FIG. 3. Next, at decision point 610, a check is made to see if the requested severing would involve the special case of "forgetting," as will be explained shortly. If no "forgetting" will occur, then at step 660 the numbers of the two thoughts are removed from each other's relationship lists and the line between thoughts 310 and 314 in the graphical display shown in FIG. 3 may be removed.

The special case of "forgetting" an existing relationship will now be explained. Consider the example plex shown in FIG. 3. If the relation between thought 314 ("Projects") and central thought 310 ("Natrificial") is severed, then there will be no path at all connecting thought 314 with central thought 310, and thus no way to access thought 314 from the current thought. Thought 314 will be isolated. In that sense, thought 314 will be "forgotten" if the severing is performed. Therefore, in the process depicted by FIG. 6, decision point 610 detects such cases (see below, "Determining if thoughts will be isolated"). In such cases, the number of the "forgotten" thought (i.e., thought 314) is deleted from the current relationship list 245 (FIG. 2) of central thought 310 at step 620, and is added to the corresponding past relationship list 250 of central thought 310. Recall that the past relation lists 250 are included as part of each thought's data structure, as illustrated in FIG. 2. Next, the forgotten thought's own fields are revised to reflect its status as a "forgotten" thought: namely, at step 630, thought 314's current relationship lists 245 are merged into its past relations lists 250 (i.e., copied from 245 to 250 and then erased from 245), and at step 640 its "long term memory" flag is set to "on." At step 650, forgotten thought 314 may be added to a global long term memory thought list. At step 670, the plex is redrawn, reflecting the absence of forgotten thought 314. It is possible to forget more than one thought at once, in which case all of the forgotten thoughts will be modified as described for thought 314.

By reference to particular usage statistics, the forgetting operation may be automated. More precisely, the present invention may automatically forget a thought that has not been accessed within some user-definable period of time, as reflected by the usage statistics associated with that thought.

Determining If Thoughts Will Be Isolated. A thought will be isolated when it is not possible to return to the central thought via any link other than that link which is being severed. Similarly, any thoughts ("Rodin" 950 and "Liquid Noise" 960 in FIG. 9) related to the severed thought ("Projects" 314) will be forgotten so long as their only link to the central thought existed via the severed thought ("Projects" 314). One method of determining whether it is possible to return to the central thought from a thought whose link has been severed is illustrated by the recursive algorithm disclosed in FIG. 10.

An alternative method that may provide enhanced performance is disclosed in FIG. 24. This method relies on a programming object termed a ThoughtList, which utilizes a map of bits representing thought numbers. Each bit in the map corresponds to a thought, with a (1) indicating a thought on the list and a (0) indicating a thought not on the list. In accordance with this methodology, one can store the existence or nonexistence of over a million thoughts using merely 128 kilobytes of storage. The storage required for this technique is determined by the highest possible thought number divided by eight. All memory or storage used for this list is zeroed out, and is subsequently modified (to 1's) at locations corresponding to thoughts. Specifically, when a thought is added to the list, the bit number X of byte number Y is set, where X is the remainder of the thought number divided by eight, and Y is the thought number divided by eight. This method may also be used for storing normal thought lists.

Parentless Thoughts. An alternative embodiment of the Brain maintains a list of parentless thoughts (thoughts without parents) that is updated whenever changes are made. When a thought is created, linked, or unlinked, the affected thoughts are checked for parents. If these thoughts have parents, they are removed from the list; otherwise, they are added to the list. If necessary, the list of parentless thoughts may easily be regenerated by checking all thoughts for parents. Because this list is maintained, it is not necessary to ensure that all thoughts are connected. Thoughts may therefore be unlinked without verifying the existence of alternative return routes to the original thought.

Forgetting and Remembering Without Searching. When thoughts are unlinked without searching, it becomes necessary to have an alternative interface for forgetting. Among the possible methods for accomplishing this result are dragging the thought to a forget icon or selecting a command. The thought will then be forgotten along with all of its childward descendants that do not have other partners and are not the active thought. To decide which thought to forget, the Brain makes a list that includes the thought to be forgotten and all thoughts childward of it. The Brain does not add the active thought to this list. To remember the thoughts, the user can drag a thought to a remember icon or select a command. The thought and all its forgotten childward descendants will thereby be remembered. More detailed algorithms for implementing these forgetting and remembering operations are set forth in FIG. 17.

Figure 11:
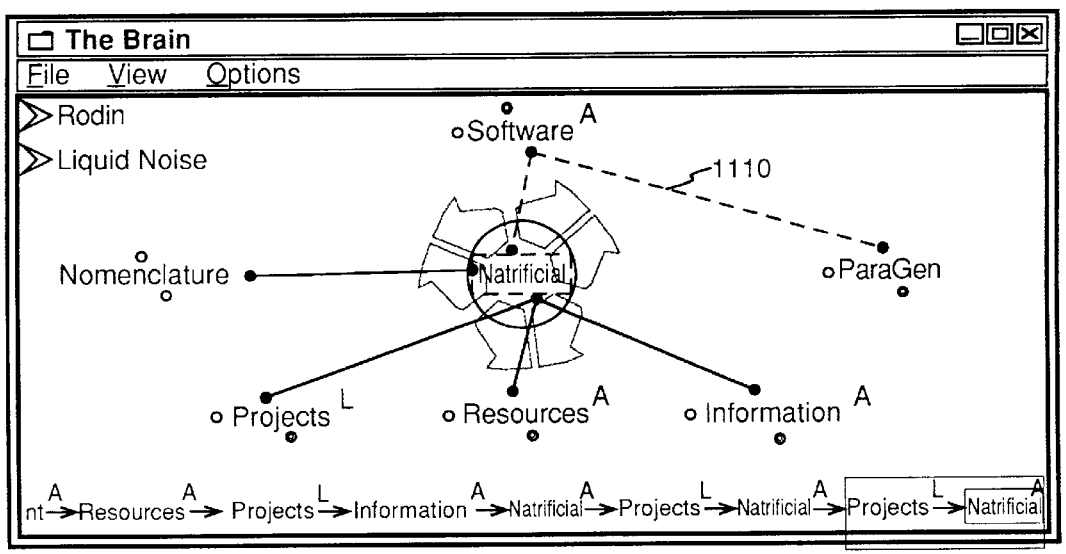
FIG. 11 illustrates a graphical user interface screen display, in accordance with another aspect of the present invention.
Figure 12:
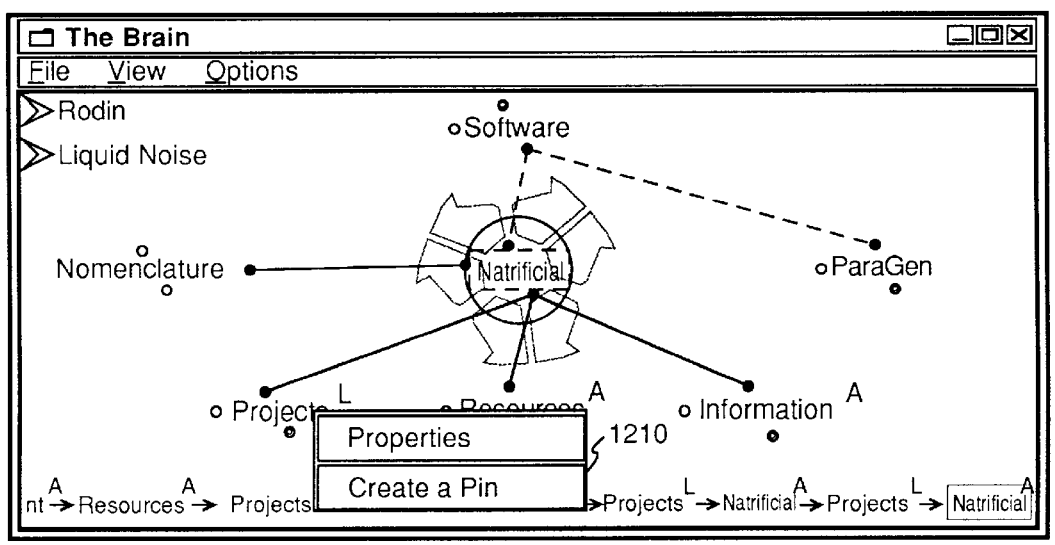
FIG. 12 illustrates a graphical user interface screen display, in accordance with another aspect of the present invention.

Accessing Long Term Memory. To access thoughts that are stored in long term memory, in some embodiments the user can interactively activate the display of long term memory relationships (for example, by means of a menu selection or function key). The display will then be refreshed, and thoughts related by long term memory relationships will become visible and are connected (as shown in FIG. 11) to the central thought with a line, such as line 1110, of a different sort than that used for normal relationships. A long term relationship can then be recreated as a current relationship by using the "Relating Existing Thoughts" technique described above. In that case, the appropriate thought numbers (see FIG. 2) are copied from past relationship lists 250 to the appropriate, current relationship lists 245. The appropriate thought numbers are then moved in the global long term and short term memory lists, and the display is once again redrawn.

In an alternative embodiment of the present invention, each thought's headcase does not include a list of past relationships. Rather, each thought's headcase merely contains a flag identifying it as a forgotten thought or a present thought. When a user interactively turns on a display of long term memory within this alternative embodiment, forgotten thoughts and their relationships to present thoughts are added to the display, and severed relationships between present thoughts will not reappear. This alternative embodiment may offer certain advantages, including without limitation (i) presenting the user with a simpler, more readily comprehensible set of information regarding past relationships within the matrix; and (ii) reducing the complexity of the matrix's data structure and hence the computing resources used to operate the matrix.

These same principles used for implementing long and short term memories are equally applicable for creating many other classes or levels of memory. A plurality of memory levels may be created and thereafter any or all of the relationships stored at each level or in each class may be selectively chosen for viewing. For example, a user may elect to display only the top level, all levels, up to a specified level, or particularly designated levels having no immediate connection.

Permanently Deleting a Thought. It is also possible to permanently remove a thought from the matrix. This is accomplished by clicking on a line (such as line 1110) which connects a thought which is already in long term memory. When severing a relationship in this manner results in a thought or thoughts becoming isolated, this thought or thoughts are removed from the global thought list and from the past relationships list 250 of the central thought. Although a portion of the thought data relating to a deleted thought will be erased, in one embodiment of the invention, the space occupied by the thought in the flat file database will be retained so that the Brain does not have to remove all references to it. The Brain may be unable to remove all such references because they may occur on other lists or in other matrices which the Brain cannot control. Furthermore, comprehensive elimination of references may be computationally prohibitive, and leaving the thought's space in the flat file database requires relatively little storage space.

Dividing a Matrix. When a user selects a link that will result in the isolation of particular thoughts, the user may optionally forget the thoughts, permanently forget the thoughts, or split the matrix into two parts. Splitting the matrix into two parts will create a new thought that has the same name as the first thought to be isolated, but the document associated with this newly created thought will be a new matrix that is named after this first thought to be isolated. This new matrix will consist of all the thoughts which will be isolated in addition to the thought located at the position of the last link to be selected. That thought will reference the original matrix, and will be named after the original matrix.

Creating New Thought Flags and Types. To define a new thought flag, the user interactively selects a thought and then enters a flag name and its default state. To define a new thought type, the user enters the name of the new type, its default flag states, and any fields that the type has. The new types and flags can thereafter be referenced by the user when creating new thoughts or changing thought properties. The type of a thought dictates which application program is used to edit the information associated with that thought. Application programs may be directly associated with a thought in the same way that the document window 360 in which a thought may be edited is associated with active thought 330. One embodiment of the invention assigns a preferred thought type to thoughts, but the user can override this thought type assignment by selecting another thought type either at the time of creation or by changing the default thought type in the preferences. Acceptable thought types include any computer application capable of communicating with the Brain employing the methods disclosed herein. In some embodiments, the correct thought type for a document is determined by the file extension that the location specifies.

Figure 13:
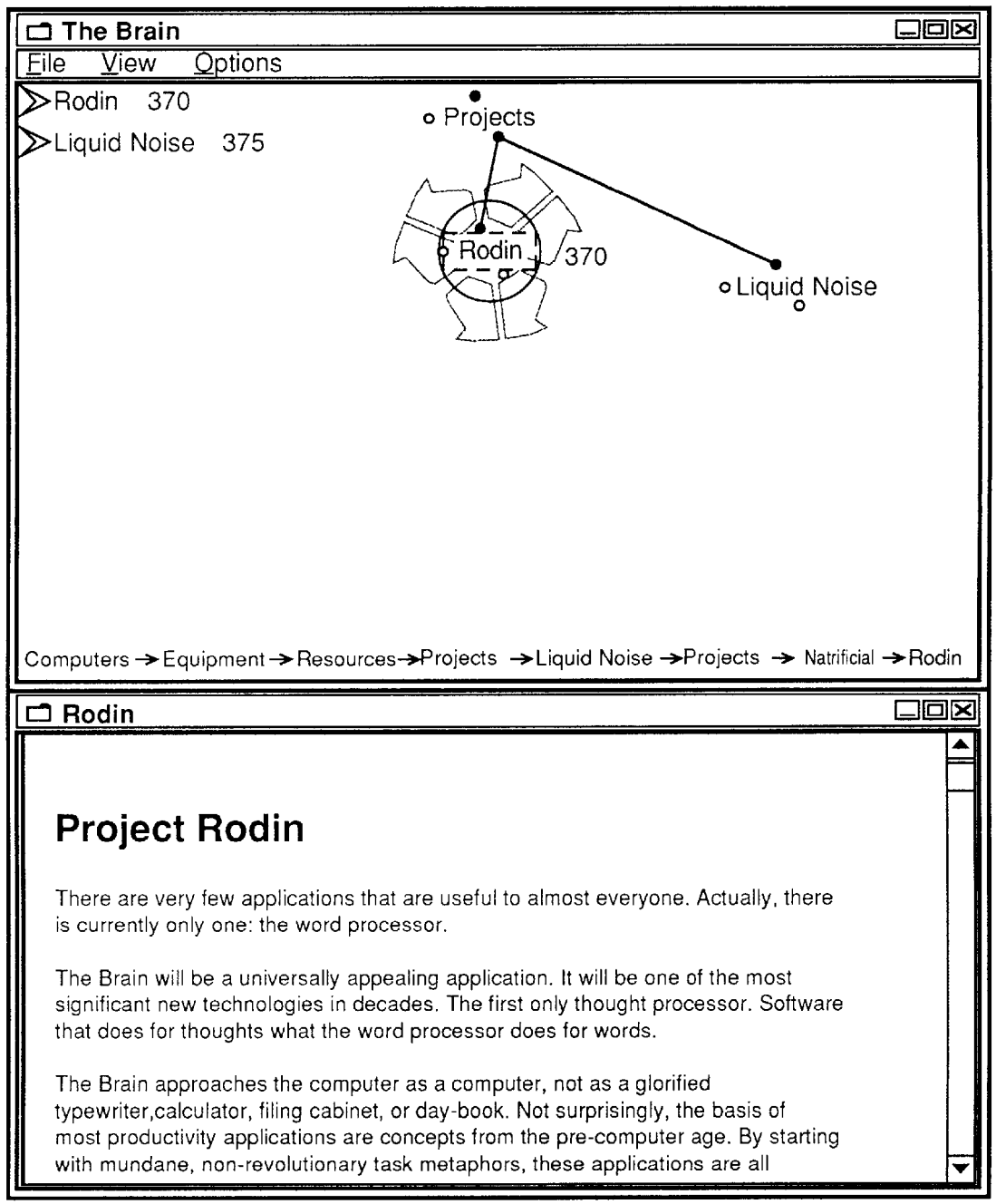
FIG. 13 illustrates a graphical user interface screen display, in accordance with another aspect of the present invention.

Thought Pins. Thought pins are used to get instant access to commonly used thoughts. In the upper left corner of FIG. 3 are two thought pins 370 and 375, labelled "Rodin" and "Liquid Noise." Thought pins can be moved by the user to any location or deleted. To create a new thought pin, the user simply moves the cursor (using mouse/control device 160), and clicks on or otherwise highlights the existing thought for which a thought pin is to be created, and then selects a "Create Pin" command or the like from an ensuing pop-up command menu (such as menu 1210). Alternatively, pins may be created by dragging thoughts to predefined zones within the display. Selecting an existing thought pin (e.g., using mouse/control device 160 to position the cursor over the pin, then clicking the control devices's button) makes the pin-represented thought into the new central thought of the current plex. For example, selecting thought pin 370 ("Rodin") in FIG. 3 would result in the plex transforming into the plex displayed in FIG. 13, with thought 370 ("Rodin") as the central thought. Note that thought pins may be represented internally by the number(s) of the thought(s) they reference and an explicit, user-specified display location.

Brain Messaging System. An embodiment of the present invention utilizes a brain messaging system ("BMS") to enhance interoperability between the Brain and the applications used to create, edit, and display documents; this messaging system plays a central role in matrix creation, as discussed below. Applications that comply with the BMS are referred to as "Brain-enabled" applications. Some embodiments of the present invention only interoperate with Brain-enabled applications. Other embodiments take advantage of the program-to-program interface features of operating systems such as Windows® by Microsoft to enable any application to be launched and operated within documents associated with thoughts, without need for a specialized BMS. Whether or to what extent a BMS is necessary to enable Brain-application interoperability depends partly upon the capabilities of the underlying operating system. A Windows® embodiment of the present invention, for example, allows the user to specify a list of Windows® applications which will create, read and write to files corresponding to thoughts of a certain "type."

For instance, a spreadsheet application such as Microsoft Excel® would enable the creation of Excel-type thoughts which, when activated by the user, launch Excel, and load the Excel document associated with the specified thought. Further, in one embodiment of the present invention, the display icons corresponding to thoughts are specialized according to thought type. For example, a thought of the Excel type would be symbolized by a display icon graphically depicting the thought as such an Excel type. A BMS may not be required under Windows® to enable the limited interoperability described in this paragraph. Methods of processing thoughts are described in greater detail below.

Even in Windows®, however, the incorporation of a BMS enables improved interoperability between the Brain and Brain-enabled application programs. Brain-enabled applications permit users to link thought directly to objects within Brain-enabled application documents by dragging to the document windows. With applications that incorporate hyperlinks, the BMS allows the user to drag thoughts directly to those hyperlinks and associate with the objects that they reference. The BMS can be configured to work in concert with messaging systems native to the operating system. For example, Microsoft Windows® uses Dynamic Date Embedding ("DDE").

Using the program-to-program messaging capabilities of known operating systems, the BMS permits the Brain to provide specific instructions to Brain-enabled applications. For instance, the BMS may include the following core messages from the Brain to the application. The Brain may request the identity of the document over which the mouse pointer presently resides; the application would respond with the current document name and file location using the name and address symbol of the native operating system, or the hyperlink's name and file location. The Brain may signal the activation of a particular thought, and the Brain will provide the number, name, and location of this thought; if a thought is being created, the Brain will also provide the template parameter(s) corresponding to this new thought; in response, the application will save the current document and load or create the new document if the new document is of the same type, and if creating the new document, will use the template parameter to open the default document. The Brain may request that the application move its window to the top; in response, the application will make its window visible over any other applications. Finally, the Brain may request that the application move its window in a requested manner, save, rename, or relocate its document; in response, the application will do so, as instructed by the Brain.

The BMS may also include by way of example the following core messages from applications to the Brain. An application may ask the Brain to identify the active thought; the Brain will respond with the active thought's number, name, and location using Brain-specific symbols. An application may ask the Brain to activate a thought with a specified number, name, and location, and the Brain will do so. An application may ask what thought corresponds to a particular number, name, and location; the Brain responds with the thought's number, name, and location, or will return "false" if the specified thought does not exist. An application may ask the Brain to create or link a specified thought, related by designated child/parent links to another designated thought; if requested, the Brain performs the specified operation. Finally, an application may tell the Brain that the application is Brain-enabled, and will provide the information needed to start the application, the application's document types, and their respective descriptions; if so, the Brain stores this information and adds that application's document types to the list of permissible thought types.

Automatic Thought Recognition. The Brain can activate thoughts based on commands sent from other application programs as well, including without limitation, the editor or calendar applications. For instance, the editor may contain a word that is also a thought name. Using the BMS, the editor can identify the specific word or words as being a thought and automatically highlight them on the display. Alternatively, the Brain could be queried when the user selects one of these words. When a word is successfully identified as being a thought and is selected by the user, the application may then send a message to the Brain requesting the activation of the specific thought. A similar process may be used to recognize and activate thoughts through any Brain-enabled application.

Creating Thought Plexes. As described earlier, thought plexes are the graphical displays of a group of related thoughts, consisting of a central thought and any parent, child, jump, and sibling thoughts. There is always at least one thought plex. In one embodiment of the present invention, additional thought plexes can be created by using the control device 160 to position the cursor over any thought other than the central thought, and dragging the selected thought to the desired location of the new plex.

Figure 9:
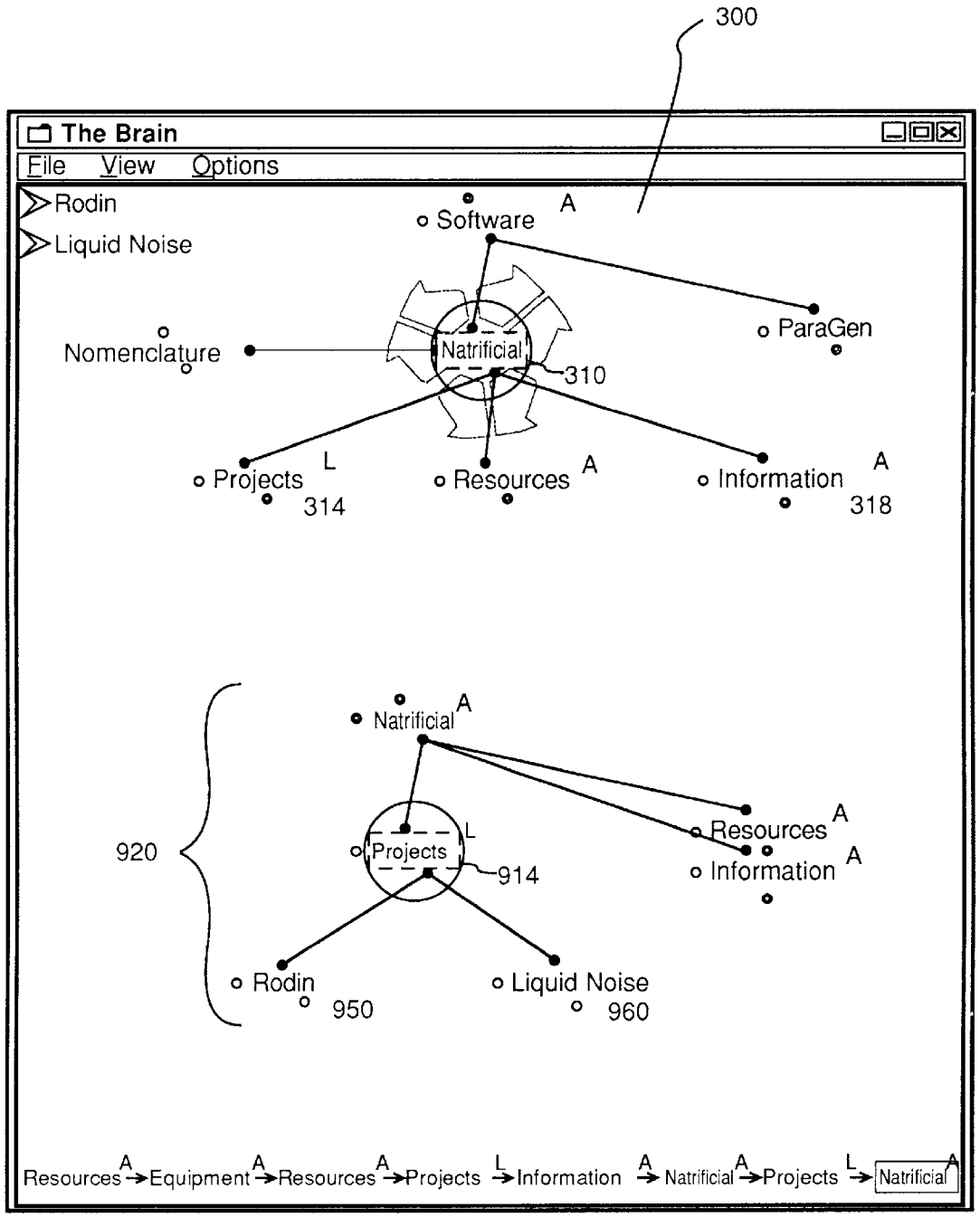
FIG. 9 illustrates a graphical user interface screen display, in accordance with another aspect of the present invention.

Each time a user creates a plex, that plex is added to the screen display along with the other plexes previously presented on the screen display (see FIG. 9).

The figures demonstrate an example of the manner in which a new plex may be created. First, in FIG. 3, a user interactively selects the thought 314 ("Projects") to be a new central thought by using control device 160 to position the cursor over that thought, then selects the thought by clicking and holding a button on the cursor control device. The user then employs control device 160 to move the cursor to the desired location of the new plex and releases the button. FIG. 9 demonstrates the screen display which results. Plex 920 has been added to the screen display, with the thought 914 ("Projects") as the central thought of new Plex 920. The Plex is the on-screen interface to the matrix in which data is stored.

Automated Matrix Creation. Matrices may be created either on command or, in one embodiment of the present invention, they may be created on the fly. When created on command, matrices are static and will not change unless a user explicitly commands that a change be made. When created on the fly in response to user inputs and navigation, by contrast, a matrix will change as the information represented by that matrix changes.

Automated matrix creation has many potential applications, including the automatic creation of a matrix representing a standard hierarchy such as those commonly used in directory structures. In this application, the Brain begins at the root of the hierarchy and creates a child thought for every file and folder, and then goes into each folder and repeats the process. This recursive process effectively generates a plex representing a directory structure, and as discussed above, can be performed on the fly or as the user navigates amongst thoughts. The Brain begins by displaying the current thought within the hierarchy. Each item within the presently displayed thought is displayed as a child, and children that contain other items are displayed with a highlighted child gate to indicate the same to the user. The level of the hierarchy that contains the current item is displayed as a parent, and the other items within the level containing the current item are displayed as siblings.

The automated conversion of a standard hierarchy to a Brain matrix allows users to subsequently modify the resulting matrix in a nonlinear nonhierarchical manner, thereby creating a nonlinear nonhierarchical information structure with a minimum of effort. Furthermore, the ability to view and activate siblings may be valuable irrespective of whether nonhierarchical relationships are established within the matrix.

The present invention additionally may automatically generate matrices reflecting self-referencing hierarchies, such as those used to organize the World Wide Web ("WWW"). When an item in a self-referencing hierarchy is encountered and has already been added to the matrix, the present invention links to the existing thought rather than creating a new thought. This technique may result in "wrap around" structures and multiple-parent structures that actually exist in a self-referencing hierarchy and can now be displayed with the advent of the present invention.

Similarly, the present invention permits a matrix to be automatically generated from a hypertext document. This document becomes the central thought, and the linked items within the document become children thoughts. Those linked children may subsequently be explored in a similar manner. In cases where hypertext uses somewhat predictable link names, the present invention may link thoughts in a more context-sensitive manner. For instance, files located on a remote computer or Internet URL may be displayed as jump thoughts, and files which are disposed in a hierarchical directory location above the current directory may be displayed as parent thoughts. This method for automated generation of matrices may be restricted so that it does not create overly cumbersome plexes. For example, it may be designed so that it does not create thoughts relating to files located on remote machines.

A matrix may also be created on the fly to reflect a user's navigation within a collection of hypertext content such as the Internet's World Wide Web. In this embodiment, each hyperlinked document selected by the user is linked as a child to the document from which it was selected, and the hyperlinked document becomes the active thought. Once such a structure has been created, the "back" command may be used to activate the parent thought, thereby moving the user to the previous page. Similarly, the child thought is activated if the user selects the "Forward" command. The added benefit to using this matrix arises in cases where the user selects a different hyperlink rather than the "Forward" command; in such cases, the new hyperlink is added as a child thought. Also, if a user navigates to a page which has already been visited, there will already be a thought representing that page which will be linked to as a child. In this fashion, users may generate a matrix that is exceptionally useful for tracking browsing history relative to traditional methods.

Furthermore, matrices representing the results of a database search may also be generated. Such searches are typically performed in response to words input by the user, and the results are usually displayed in an ordered list arranged by some measure of frequency or relevance. One embodiment of the present invention parses such lists to identify other common words or themes from among the results. In accordance with the result of this parsing step, a matrix is created with the query as the central thought and with the other common words or themes as child thoughts. Results that do not share common words or themes are displayed as children. When a child thought is activated, if the child has a common word or theme, the results sharing that commonality are broken down again. If the child is a result, then results that are contained within that result are displayed as children, and items related to that result are displayed as jumps.

Moving Thought Pins and Plexes. In one embodiment of the invention, thought pins can be repositioned by dragging them with the mouse or other control device. Thought plexes can be repositioned by dragging their central thought with the mouse or other control device. Thought pins and plexes can be deleted by dragging them off of the display. Eliminating a plex from the display does not result in any thoughts being forgotten. Forgetting involves a different user-interactive process discussed above (see "Severing Relations Between Existing Thoughts").

Resizing a Thought Plex. In one embodiment, a thought plex can be sized by dragging the circle which surrounds the central thought. Making the circle bigger makes the entire plex bigger and vice-versa.

Changing a Thought Pin. In one embodiment of the present invention, a thought pin can be made to reference a different thought simply by dragging the desired thought onto the pin.

The Brain Freeze. In response to a user's request or in response to a regularly scheduled system request for backup, a "Brain Freeze," in one embodiment, saves the state of all parts of a matrix at a given point in time, copying all the information to a read-only format for later use.

Processing Thoughts

Naming Thought Files. By default, a thought does not have a matrix or operating system file location specified when it is created. If the user selects an active thought without a specified location, a Windows® embodiment of the Brain opens a dialog that allows the user to select the type of file to create. After the user selects a file type, that Brain uses standard operating system methods to create a file of the selected type and thereafter names the file by appending the file type to the name of the thought. The file associated with that thought is placed in a Brain specified folder (_brn folder) (discussed below) and is opened immediately. The file name and the thought name are independent, and the renaming of a thought does not compel the renaming or relocating of its file within the network or operating system. Therefore, if the file is shared, other programs and users not operating the Brain will still be able to locate it.

Opening a Thought. A thought's headcase file may specify an item (a thought document) within a traditional file system that is associated with the thought. This thought document may reside in the storage system of a local computer, or may be retrieved through a network, including without limitation a LAN or the Internet. When a thought is activated, the Brain may request that the operating system open the thought document associated with the selected thought. When a thought document is saved, it will typically be stored by most application programs to the file location from which it was loaded. This location is, of course, the location that the thought references. Accordingly, a user may both open and close files from the Brain without navigating a traditional operating system's file reference means, and irrespective of the storage location of that file.

A user may optionally limit automatic thought document loading to those documents having specified file types or residing in certain locations. File extensions typically may be used to distinguish among file type. For example, file location, usually placed before the filename and separated from the filename by a backslash, allows a Windows® embodiment of the invention to discern the location of each file; periods and forward slashes allow a UNIX or Internet embodiment the same utility.

Editing Thought Documents. Each thought's document contents are displayed in document window 360, as illustrated in FIG. 3. When the current thought is changed, the last thought's document is saved (unless otherwise directed by the user) if necessary and then the new current thought's document is loaded automatically. The user never has to issue "save" or "open" commands to access thought documents, nor does the user need to explicitly identify or invoke an editor or other application program to process the thoughts. These operations are performed automatically by the Brain, seamlessly and transparently. When a thought is activated by the user, the Brain saves the previously active thought, if it has changed, then loads the newly active thought. Well-known computer programming object technologies, including without limitation Microsoft's Object Linking and Embedding ("OLE"), allow the document to make references to data which is created and edited by other programs. Using standard operating systems calls, the present invention can display and allow the user to edit these objects with the appropriate computer programs. In addition, the document may also store references to the location of other documents on the storage systems available to the computer, allowing the user to open them with the appropriate computer programs using a more traditional operating system method.

Linking to Remote Files. Using the BMS or another method of interprocess communication, the Brain can request an application to identify the file it presently has open. The availability of this technique allows the Brain to create thoughts representing files that are open in other application programs. In one embodiment, the user may do so by simply dragging a link from a thought and releasing the selection button on the cursor control device when the pointer is situated over the desired application window. Upon the performance of these steps, the Brain queries the application for the identity of the file it has loaded, and the Brain creates a thought and sets the name and location of this thought in accordance with the application's response to the Brain's query. The thought (in this case, the active document in the application window) is thereby linked to the gate from which the user dragged the cursor. For instance, if the document is a Hypertext Markup Language ("html") World Wide Web site stored remotely on the Internet being viewed using a web browser application such as Navigator® by Netscape, the Brain will name a new thought based upon the document's Internet URL (Uniform Resource Locator) or the contents of an html "title" tag. When, in later use, a user reactivates this thought, practicing methods described above, the Brain will launch the user's preferred web browser application, and request that the web browser download the html file from the remote URL.

Figure 22:
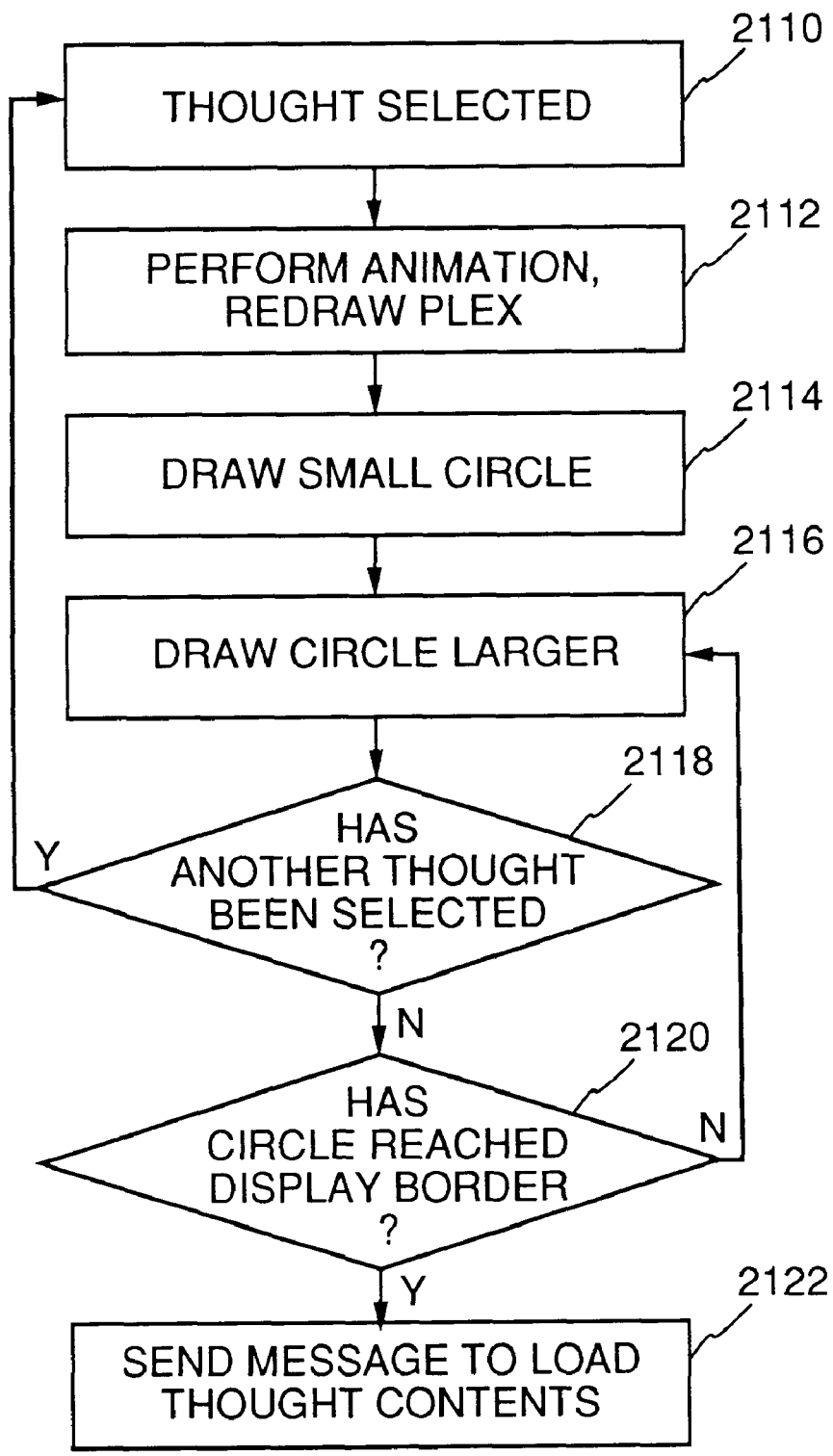
FIG. 22 illustrates a flow chart describing one method for implementing the delayed loading feature of one embodiment of the present invention.

Delayed Loading. In some instances, the loading of the contents of a thought may require the expenditure of considerable computing resources, and it may be desirable to allow the user to navigate through a series of thoughts without loading the content of every thought through which a user passes along the path to reaching a particular destination thought. This functionality is implemented in accordance with the flow chart illustrated in FIG. 22, and allows the passage of a duration of time noticeable to the user before loading the contents of a selected thought. More particularly, upon the selection of a thought by the user at step 2110, the plex is redrawn in step 2112 using the animation techniques discussed herein, and a loading delay procedure initiates. One embodiment of the present invention uses an expanding circle to appraise the user of the status of the loading delay. At step 2114, this expanding circle begins as a small circle oriented within or about the area representing the central thought, and the circle expands with the passage of time. At step 2116, the circle is enlarged and is redrawn. Next, at step 2118, the method queries whether another thought has been selected. If so, the routine returns to its beginning, step 2110, and the loading delay process is initiated with respect to the newly selected thought. If another thought has not yet been selected, in step 2120 the routine queries whether the circumference of the circle has grown to reach the periphery of the Brain window in which the present plex is graphically displayed. If so, the routine generates and sends a message to load the contents of the selected thought in step 2122. If not, the routine returns to step 2116 where the circle is enlarged and redrawn, and the routine continues. With this method, thoughts are not loaded during a predetermined period of time after their selection, and are not loaded if another thought is selected during this time. This delayed loading may be used to allocate optimally the computing power available to a user.

Some prior Internet browsing means require every World Wide Web site to incorporate user navigation methods within hypertext documents. Those methods inefficiently force users to download irrelevant information, merely for the purpose of navigating through it. One strikingly powerful application of the present invention's delayed loading technique allows expedited navigation through Internet pages or files without waiting for the content of intermediate pages or files to load.

Changing Thought Properties. Thought properties such as name, flags, priority, and category can be changed using a thought properties dialog box, such as dialog box 710, which is accessed by the user employing mouse/control device 160 and/or keyboard 150 to select a particular thought and then the thought properties dialog box. In some embodiments, the properties dialog box remains visible at all times, and changes to reflect the properties of the current central thought.

Figure 14:
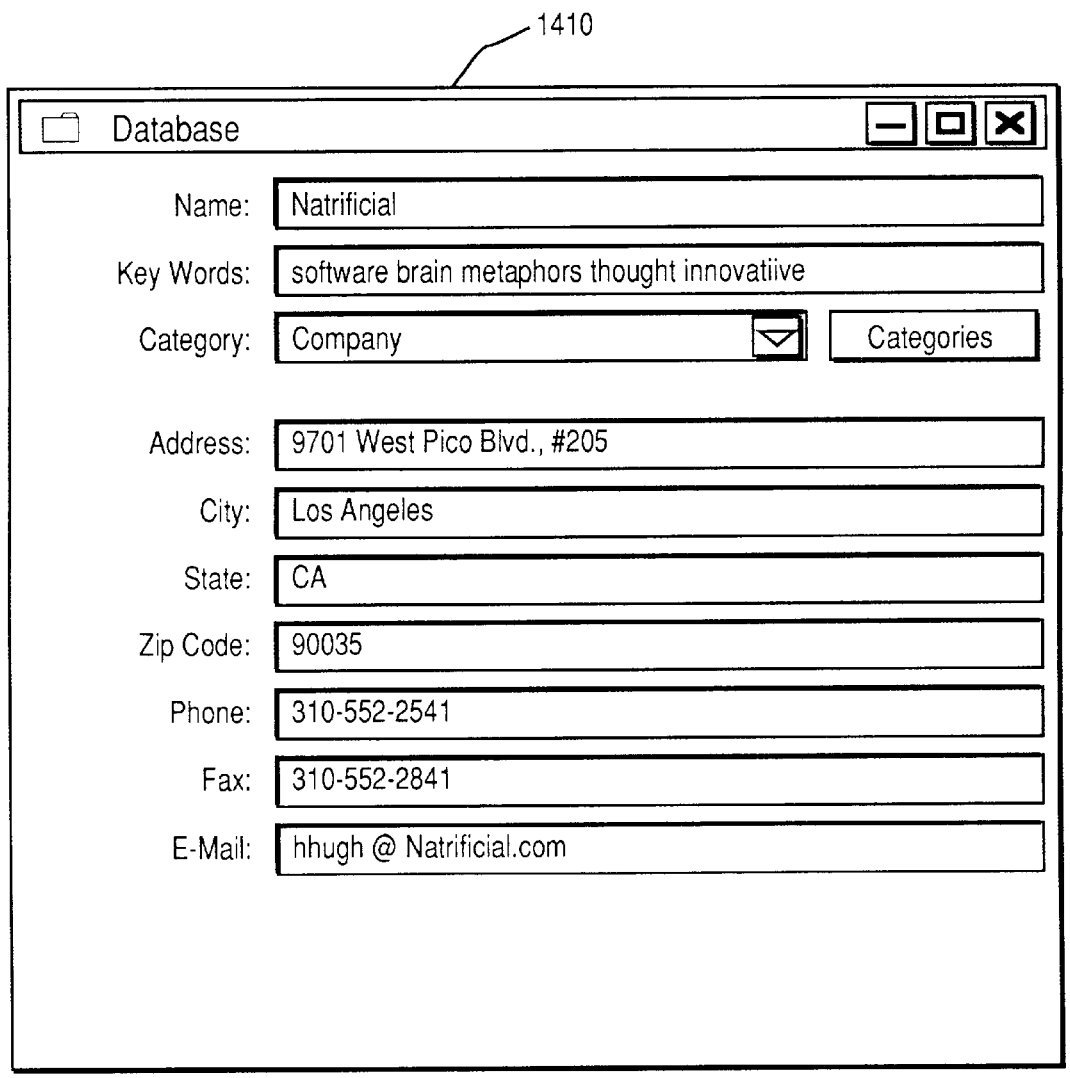
FIG. 14 illustrates one embodiment of a dialog window for editing thought fields.

Editing Thought Fields. Thought fields can be edited in a dialog box or window such as 1410 in FIG. 14. In one embodiment, the field names are displayed to the left and their contents to the right. Thought fields are automatically loaded and saved, in the same fashion as are the contents of thought documents, invisibly to the user every time a thought field is modified. All thoughts of a certain category possess the same available thought fields, which fields are defined by the user in establishing and modifying thought categories (see above, "Category").

In one embodiment, every thought category 240 possesses at least two fields. Those default fields are the "Name" field and the "Key Words" field. The contents of these default fields are identical to the contents of the properties called "Name" and "Key Words" respectively.

Rewinding and Replaying Previous Operations. An event list is created automatically by the Brain, as the user works. The event list is a recording of each action the user takes. It stores how to undo each action and how to repeat each action. At the user's request, the Brain can then use this information to "rewind" and "replay" the actions of the user.

Thought Lists. Internally, within a computer, the Brain stores thought lists as a list of thought numbers. To the user, the Brain displays as a list of thought names. One embodiment of the present invention keeps a list of all short term memory thoughts and long term memory thoughts. In addition, a list of thoughts is created for each defined thought type. Lists of thoughts can also be manually created (see below, "Trains of Thought" and "Searching"). The user can activate a thought in a list (make it central in the current plex) by clicking on it. Thought lists can also be used to perform group operations on thoughts such as printing, changing properties, or even saving (to save only a selected portion of the matrix). One embodiment used to maintain thought lists, using bitmap lists, is discussed in the "Determining If Thoughts Will Be Isolated" section above.

The Past Thought List. One special example of a thought list is the past thought list. FIG. 3 illustrates how a past thought list 380 can be created automatically as the user works. Each time the user changes the current thought, the number of the new central thought and the time it was activated are added; when the user stops working, a null and the time are added. In this manner, the Brain tracks the user's work with reference to the timeframe in which it was performed, and this information is recorded for later reference. In the one embodiment, it is possible to display the past thought list as a list (such as past thought list 380) of thoughts which scrolls along the bottom of the display as the user activates thoughts. For example, each time a user activates a separate thought, the previously activated thought is placed at the right-hand end of past thought list 380 pushing the older thoughts to the left of the screen. The oldest thought that cannot fit on screen is eliminated from view from the left-hand end of past thought list 380. This list may be scrolled to reveal thoughts that have disappeared.

Trains of Thought. Another special example of a thought list is the "train of thought," which lists a series of thoughts in a particular sequence as desired by the user. A train of thought can be created by simply navigating through the desired thoughts in the same order as the user wants them to appear in the train of thought. This will automatically cause the desired sequence of thoughts to become part of the past thought list, as noted above. As shown in FIG. 11, the user then interactively selects the desired section of the past thought list using mouse/control device 160. In the case of FIG. 11, the user has selected "Projects" and "Natrificial" the two most recent thoughts—for inclusion in a train of thought. The user then interactively selects the Create Train command 1120 by using a pull down menu, function key or similar means. In response, the selected sequence of thoughts is copied to a new thought list and the user is asked to name it, thus creating a new "train of thought" thought list.

Trains of thought can be used for accomplishing tasks that involve a number of pre-existing parts. For example, an attorney might use a train of thought to assemble a number of pre-existing sections of text (stored in separate thought documents) into a new contract, or an engineer or computer programmer can use trains of thought to assemble a new computer program out of a pre-existing library of subroutines.

In one embodiment of the invention, a selected train of thought may be identified in a plex so that it is easier for a user to follow. Specifically, the active thought in a train may be identified, and the next and previous thoughts on the train may be highlighted in the plex. If the active thought is not in the train, then any thoughts in the train are highlighted. Optionally, arrows may also be drawn between thoughts in the plex to reflect the order of the train of thought.

Searching. Thought lists can be filtered or "searched" according to thought category, priority, name, flags, fields, or any other subject stored within a thought's headcase file or document. This allows the matrix to be used as a searchable database. For example, one thought type might be the type "Person," which might include the attribute "City." Each thought of the Person type would then be assigned a specific "City" value by the user. Users could then request a search of the matrix for all thoughts involving persons they know who live in a certain city, by requesting a display of all thoughts on the "Person" type list, filtered as to those whose "City" attribute equals the desired value.

Similarly, the Brain enables users to create project plans, daily agendas, or to-do lists or other task-oriented thought lists and create relevant thought lists. First, the user assigns priority levels (e.g., "urgent," "important," "unimportant") or flags (e.g., "completed" or "incomplete") to thoughts as they work (see "Changing Thought Properties" above). The present invention enables users later to create a to-do list, for example, by searching for thoughts associated with a flag set in the "incomplete" position and a priority level of "urgent." The matrix search engine operates in a method similar to those widely used in commercially available database programs.

Layers. A set (or sets) of layers may be applied to every document in the Brain. Subsequently, these layers may be selectively activated and deactivated. Layers that are "on"

are displayed and available for editing, while layers that are "off" are hidden. Examples of layers can be found in many applications well known in the art such as Autocad® by Autodesk and Photoshop® by Adobe.

Usage statistics. Usage statistics suitable for keeping track of billable time, productivity, work habits or efficiency may be generated and stored for each thought as the user works on that thought, according to the system clock. These statistics include time of creation, time of last modification, time of last access by user and the time (if applicable) at which the thought was "forgotten." Each thought also stores the total number of seconds the user has so far spent processing it, the number of "events" (keyboard and mouse clicks) that occurred, and the thought's modification history (e.g., a list of all dates when that thought was modified and how long each such modification took).

In some embodiments, the system supports interactive commands for requesting the display of these usage statistics. For example, in one embodiment, a user can request to view usage statistics falling within a given time period. The Brain preferences can be set so that the display reflects different aspects of the usage statistics. FIG. 3 demonstrates how one embodiment of the present invention can display usage information automatically. By default, some embodiments show a "C" next to each thought which was recently created (380); an "A" next to each thought which was recently accessed (380, 385); an "L" next to the last active thought (390, 395); and an "M" next to each thought which was recently modified (not illustrated). Alternatively, usage statistics may be reflected by differences in the color of thoughts, or by the addition of markers. For example, thoughts that have not been accessed for a relatively extended period of time might be displayed in a color such as gray that is less likely to attract the attention of the user.

Undoing and Redoing. Undoing and redoing of operations may be supported by an internally stored event list which keeps track of how data is affected and what is necessary to undo the effects of each event. When something is undone the undo event is recorded to the redo list to enable redoing.

Figure 15:
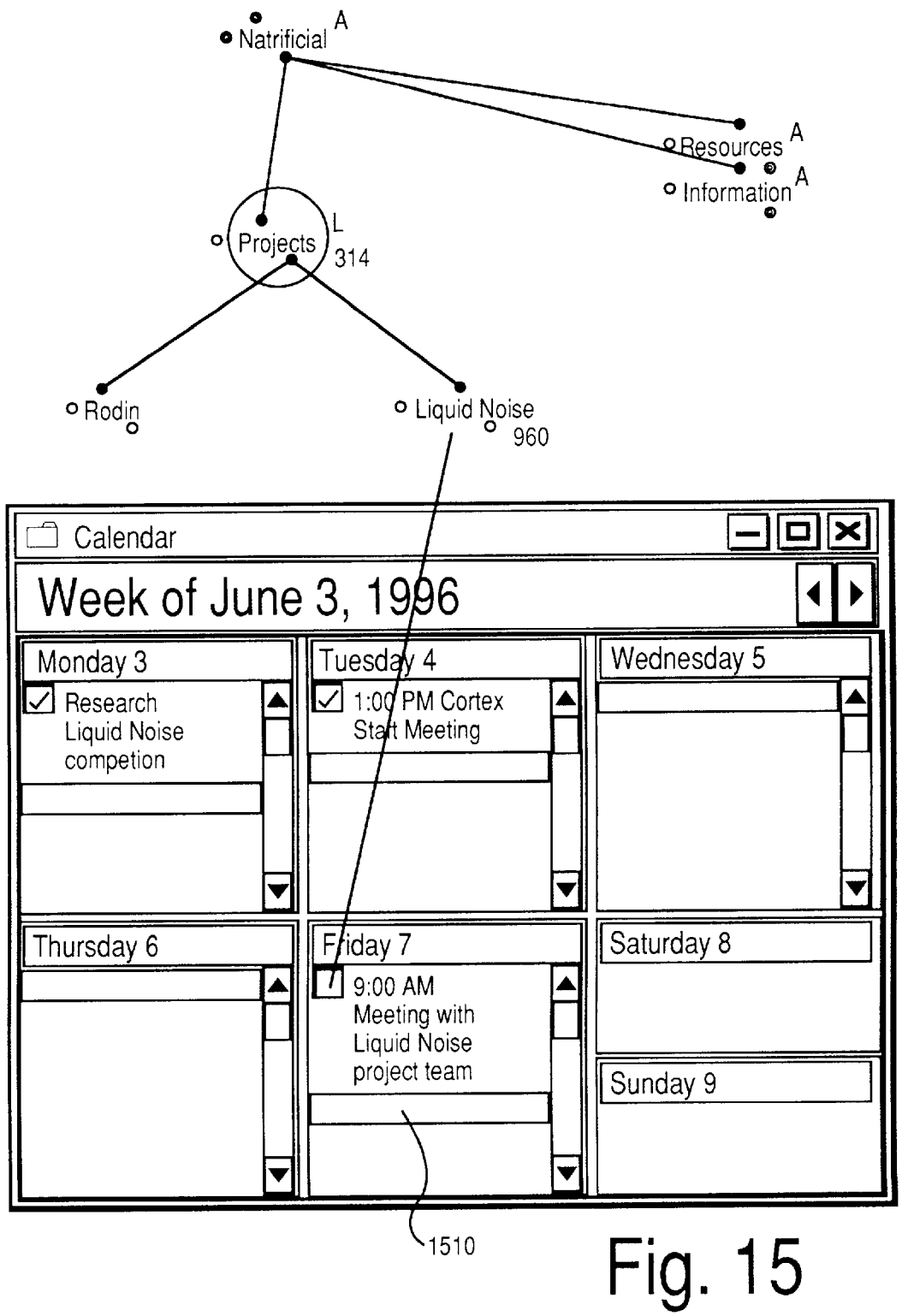
FIG. 15 illustrates one embodiment of a calendar window in conjunction with a hypothetical plex.

Calendar Scheduling. By storing thought numbers in events, appointments, schedule data, or other time-based items, it is possible to associate time-based events with thoughts. A calendar can then be used by the user to keep track of events and link related thoughts to the events. For example, in one embodiment, rather than displaying thoughts graphically in plexes, thoughts can be displayed on a calendar as demonstrated in FIG. 15. For example, the calendar event 1510 ("9:00 am meeting with Liquid Noise project team") may be associated with "Liquid Noise" thought 960. Some embodiments of the present invention permit a user to create that association by using the mouse/control device 160 to draw a line connecting the calendar event 1510 and the desired thought 960. When a user interactively selects calendar event 1510, thought 960 becomes the new central thought (as illustrated).

In addition, thoughts may be associated through calendar events with computer program operations. For example, if calendar event 1510 were associated with an alarm program, then at 9:00 am, the alarm would sound, and the present invention could also be configured to display a reminder message, or activate "Liquid Noise" thought 960 as the new central thought.

Preferences. Particular preferences relating to the operation of the presently disclosed technique may be selected by the user. The user may designate, for example, the set of colors to be used in the graphical representation of the interface and content organized thereby, the speed of the animation, the loading delay, the levels of thoughts to be displayed (e.g., which of the distant thoughts), and the wallpaper. Also saved to this table is information about the positioning of the various windows comprising the user interface and the information organized thereby.

Furthermore, all necessary information about the location of the present computer is stored with the preferences. Storage of this location information allows the user to move a matrix to another computer while preserving one's ability to access the files referenced by that matrix, provided that the files resident on the remote computer remain accessible from the computer to which that matrix is transferred.

Network-Related Features

Some embodiments of the Brain include features that enhance operability of the Brain in connection with both local and remote networks, including the Internet, as discussed below.

Remote Access to a Brain. Some embodiments of the present invention allow the use of a matrix with a second computer, although the matrix was originally created on a first computer. To the extent the files on this first computer may be locally accessed, for example through a local network, the present invention will simply access these local files. However, if the files on the first computer are not locally accessible, the Brain can copy such files from the first computer to the local computer; so that this change is incorporated into the operation of the present invention, the Brain will additionally change the location of the computer with the file (to the second computer) so that the file may be locally accessed.

Sharing Thought Documents. With most current operating systems, document sharing is based on the location of a file within a hierarchical file system. The Brain locates thought documents according to the desired sharing properties. When the user sets the sharing properties of a thought, the document is moved to a folder that possesses the requisite sharing properties. When thoughts are created, they are assigned the same sharing properties as the thoughts from which they are created. The user may optionally change the sharing properties of several thoughts by using the List manager to create a list of thoughts and subsequently assigning the desired sharing characteristics to the thoughts on this list.

Version Control. By associating a thought with a special document type that stores the names of multiple documents, a thought may be made to contain a plurality of documents. The initial steps for creating a thought that contains more than one version of a document are the same as those normally used for creating a thought. When the user wishes to create a second version, however, the create version command is interactively selected, and the user can name the new version and select its type. The user may alternatively select the default type for the new version, which is that of the old version. With this process, the location property is changed to a new file which lists the versions of the document and contains a name and location for each version. In the thought's data within the headcase, the current version number is set to the current version. The names and locations of different versions of a thought can be changed using the thought properties dialog box. A version control is displayed in proximity to an active thought having multiple versions. The user may select this control to display a list of all versions of that active thought, and may thereafter select a desired version from this list.

Selection Feedback. One embodiment of the present invention facilitates the user's navigation through the matrix by monitoring the position of the user's cursor or pointer and highlighting the elements on the display that the user could select given the present position of the user's pointing device. In other words, this feedback system indicates the elements that would be activated upon the depression of a selection button resident on the user's pointing device, in view of the present position of the pointing device. For example, a gate, link, thought, or any other display element could change color to indicate that the element would be selected if the user depressed a mouse button.

Matrices Referencing Other Thought Matrices. A thought type can be a matrix, so it is possible for one matrix to reference another matrix. For example, in one embodiment of the present invention, when an active thought is itself a matrix, a second instance of the Brain is started and it loads the appropriate matrix. This matrix is then displayed in a separate window. The ability of a user to create several matrices makes the present invention adaptable to a wide range of information storage needs, and accordingly diminishes the requisite complexity of individual matrices in cases suitable for multi-matrix storage schemes. In most of these cases, this added flexibility would likewise reduce overall system complexity. Furthermore, such an arrangement advantageously facilitates sharing of matrix data, as for example, a computer network administrator can more readily assign access privileges to single or multiple discrete matrices.

Linking Matrices. One embodiment of the present invention allows the user to link matrices together. In particular, when two matrices are displayed in separate windows, the user may copy a second matrix into a first matrix simply by dragging (with the cursor control device) from the first matrix to the second. The matrix that is dragged, the first matrix, is thereby linked to the active thought of the matrix to which it is dragged, the second matrix. The two matrices and all of their linked thoughts are thereby incorporated into the first matrix. Each of these thoughts from the second matrix that are copied into the first matrix must be renumbered during the copying process so that they do not conflict with previously-existing thoughts associated with the first thought matrix.

Matrix Sharing. A token system is used in one embodiment of the invention to allow multiple users to simultaneously modify a single matrix. In accordance with this system, when a user requests a modification, all other users are not permitted to make modifications until the matrix is updated to reflect the first user's modification. In a multi-user environment, the past thought list and other usage data may be stored once for each user, and optionally may be unified to produce data for all of the users.

Semi-Hierarchical Arrangement. In some instances, a user may prefer to arrange portions of their information in a traditional hierarchical manner. This may occur, for example, if the data is particularly susceptible to storage in a highly-structured manner and if the user has some preexisting familiarity with a hierarchical information storage structure. One embodiment of the present invention therefore allows users to store information in a purely hierarchical structure, and to access this data through traditional operating system methods. This traditional storage structure, however, may be integrated with the storage structure of the present invention to allow Brain-based storage of other data. For example, a company may wish to store information organized by the management divisions within the company. The company could create a set of folders for each division and then a second level of folders for each employee within a division; then, matrices may be placed within each employee folder, for example, corresponding to each individual employee.

Server Model for Sending Plexes. When a large matrix is created and subsequently must be accessed over a communications channel having a relatively narrow bandwidth, it is possible to send only data that is relevant to a user's location within that matrix. This is accomplished with client/server computer network architecture. In one embodiment, the client Brain identifies for the server the presently active thought. The server Brain then sends the numbers of all thoughts within the present plex, as well as the numbers of all thoughts that would become part of the plex upon the selection of any thought within the present plex. In other words, the server will send the number of the active thought, its children, parents, jumps, and siblings, as well as the children, parents, jumps, and siblings of those thoughts. This list of numbers is used by the client to determine which thoughts are already in the client's cache. Those thoughts that are already in the client's cache should be removed from the list, and then the list is returned to the server. At this point, the server sends the data corresponding to all thoughts remaining on the list. The above-described cycle is repeated upon the selection of a new central thought.

In another embodiment of the invention, an alternative procedure may be used to implement client-server communication. Specifically, on a client's first interaction with a server, the client sends an initialization message to the server that includes its location on the network. The server creates a blank list that may be of the same type as the ThoughtList used to identify isolated thoughts, and uses this list to identify the thoughts already sent to the client. Then, for each thought activated by the client's user, the client identifies the presently active thought to the server. In response, the server generates a list of thoughts having a predetermined relation (e.g., within a set number of generations) to the active thought, removes from the list any thoughts already present on the client, sends to the client the data corresponding to all thoughts remaining on the list, and adds these sent thoughts to its list of thoughts present on the client.

In accordance with these methods, the present invention minimizes the extent to which data is unnecessarily downloaded, and assures that data relating to the next-selected plex will be immediately accessible. The above-described methods enhance performance by minimizing the delay inherent in a client-server system constrained by a narrow bandwidth telecommunications facility.

Integration With Hypertext. One can incorporate matrices into hypertext by embedding so that the Brain is launched and displays the file when the hypertext page is loaded by a browser program. Alternatively, the file could be loaded and displayed in response to the selection of its link by the user. Furthermore, it is possible to define a matrix using text that is transferred to the Brain in a format such as: [Thought Number, Thought Name, Thought Location, Parents, 0, Children, 0, Jumps, 0]. Such a format could be embedded and created using a typical hypertext editor, and the Brain would simply convert this format into the normal file format and display it. Hypertext languages could also be modified to be more similar to the matrix structure simply by identifying links as either parent, child, or jump links. Such a modification would allow the present invention to base matrix creation directly upon a reading of the hyperlinks, without the need for an intermediate format conversion step.

Spider Site. Using the methods disclosed above, the present invention has the capacity to automatically generate a matrix corresponding to a map of a web site. A server can be employed to create and store such matrix-maps, and to send cached versions of the matrix-maps upon request. The sites to be mapped by this server may be identified through a list provided to the server, or the server could use web crawler techniques presently known to those of ordinary skill in the art to identify sites to be mapped.

Alternative Matrix File

Figure 16:
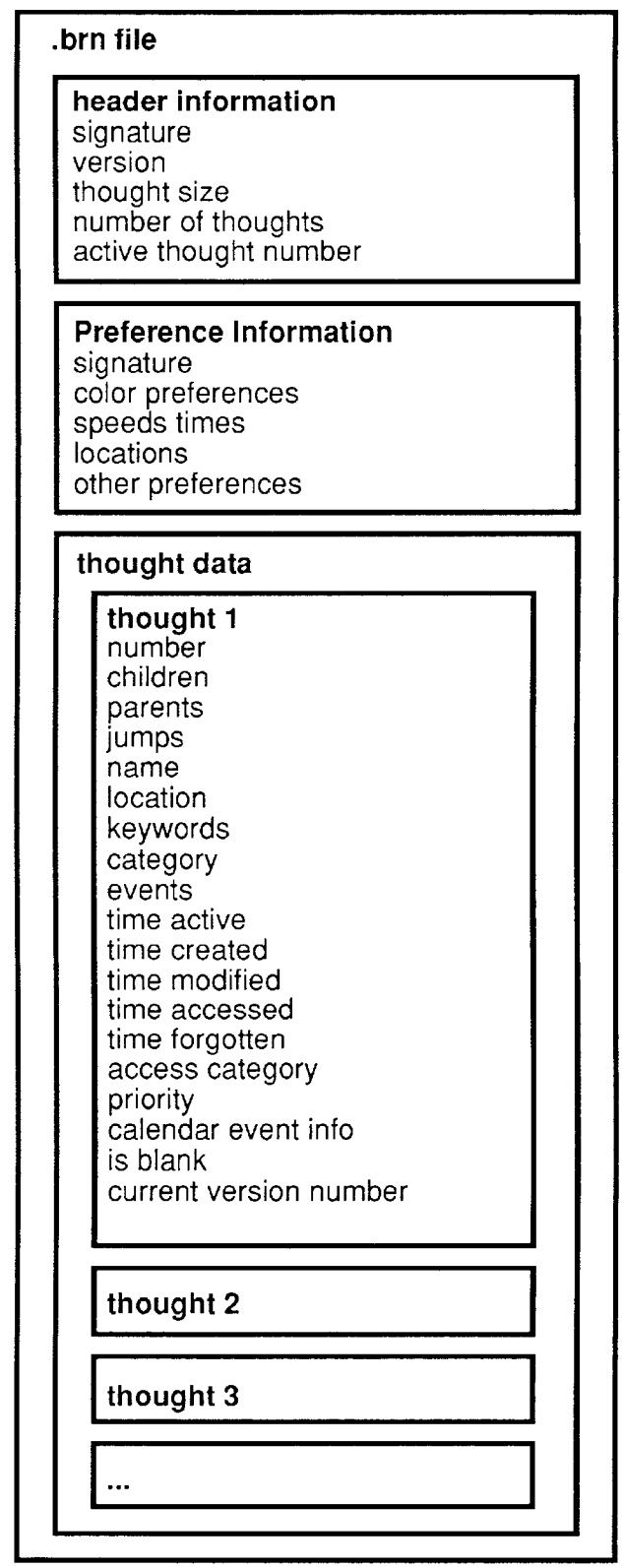
FIG. 16 illustrates the data architecture of one embodiment of the ".brn" (modified headcase) file of the present invention.

In an alternative embodiment of the present invention, the characteristics of the above-described matrix and Headcase files may be modified to permit improved functionality for certain applications. The data architecture of this modified file, hereafter referred to as the ".brn" file, is illustrated in FIG. 16. As can be seen, the .brn file contains additional elements and a different organizational structure than the headcase file illustrated in FIG. 2. While multiple file structures are clearly permissible, the selection and implementation of a single standardized structure may be particularly advantageous; the use of a universal file format allows data to be transferrable across different operating platforms. For example, a Brain created in a Microsoft Windows® operating environment could be read by a UNIX-based Brain. With this background, the principal differences between the .brn file and a generic matrix file are addressed below.

The .brn file stores all information describing the interrelation among thoughts. The file may be named by the user, and is assigned the extension ".brn." The Brain also creates a folder that is assigned a name similar to the .brn file, except that the folder is given the extension "_brn." A preponderance of the .brn file is composed of a flat file database. This structure allows thoughts to be located based on their numbers. As FIG. 16 illustrates, a thought's location in the .brn file is equal to the size of the header information, added to the size of the preference information, added to one less than the number of the thought multiplied by the size of a thought ("thought size" in the header information).

The _brn folder. All information specific to a Brain that is not contained in the .brn file is stored in the _brn folder. This folder may contain an index file for locating thoughts within the thought data, using either thought name or location. It may also contain a variable field length database for storing information relating to thoughts having unpredictable sizes, notes, and perhaps even files and versions of files. These notes may be created by a simple word processor capable of including OLE objects and thus pictures, spreadsheets, and other data. In one embodiment, notes relate to individual thoughts and are automatically loaded and saved as the associated thought is activated and deactivated. The _brn folder may also contain the past thought list, as well as the list of parentless thoughts.

Internal and External Files. Internal files, such as files located in the _brn folder, are deleted when their thoughts are permanently forgotten. Internal files are convenient because they are aggregated at a single location and are easily copied or backed-up along with the remainder to the _brn folder. External files are those not in the _brn folder, such as those in another folder, or stored remotely on a computer network including, for example, the Internet. As distinguished from internal files, these external files are not deleted when their thoughts are permanently forgotten because they could have some other use.

The user can request that an external file be converted to an internal file by selecting a "To Internal" command and specifying a location. In response, the Brain will then move the files to the specified location and will change the location of the thought file. The user can similarly use a "To External" command to convert an internal file into an external file stored at a specified location. The Brain implements this change by moving the file to the specified location and changing the location of the thought file. If the Brain attempts to create or move a file into the _brn folder, but the file name is already in use, the Brain will add a number to the end of the file name and will continue to increment that number until the conflict is resolved.

Other Variations

Detailed illustrations of an improved scheme of organizing information by an associative thought process in accordance with the present invention have been provided above for the edification of those of ordinary skill in the art, and not as a limitation on the scope of the invention. Numerous variations and modifications within the spirit of the present invention will of course occur to those of ordinary skill in the art in view of the embodiments that have now been disclosed. For example, while in the described embodiment, the present invention is implemented for a GUI for desktop computers or local area or wide area computer networks (e.g., the Internet), the present invention may also be effectively implemented for any information appliance which can take advantage of the novel associative thought scheme of the present invention. The scope of the inventions should, therefore, be determined not with reference to the above description, but should instead be determined with reference to the appended claims, along with the full scope of equivalents to which such claims are entitled.

I claim:

1. A method for organizing and processing information using a computer, said information comprising a plurality of thoughts, and said method comprising the steps of:

defining a matrix comprising the plurality of thoughts and further comprising a plurality of network relationships among the thoughts, wherein each thought may be related to at least one other of said thoughts, and wherein at least one of the thoughts is directly related to one of the other thoughts;

displaying an indicium of a first thought as a central thought on a display;

displaying an indicium of a second thought on the display wherein the second thought having a direct relation to the first thought; and selecting said second thought to be a new central thought on the display, wherein indicia of those thoughts having defined relations with the second thought will be displayed and are rearranged upon the selection of said new central thought in a manner that graphically reflects the relationship between said thoughts and said new central thought.

2. A method for organizing and processing information using a computer, said information comprising a plurality of thoughts, and said method comprising the steps of:

defining a matrix comprising the plurality of thoughts and further comprising a plurality of network relationships among the thoughts, wherein each thought may be related to at least one other of said thoughts, and wherein at least one of the thoughts is directly related to one of the other thoughts;

displaying an indicium of a first thought as a central thought on a display, the current central thought being associated with said information;

displaying an indicium of a second thought on the display, wherein the second thought having a direct relation to the first thought;

selecting said second thought to be a new central thought, whereby indicia of those thoughts having defined relations with the second thought will be displayed on the display;

loading the contents of said central thought; and viewing, editing or processing said information.

3. The method of claim 2, wherein said loading step is performed automatically.

4. The method of claim 3, wherein said loading step is delayed for a predetermined period of time so that a user may optionally navigate to another thought in a plex prior to the loading of the contents of said central thought and wherein said loading step is not performed with respect to said central thought in the event that said user navigates to another thought prior to the expiration of said predetermined period of time.

5. The method of claim 4, wherein the user is appraised by a visual display of the extent to which said predetermined time has elapsed.

6. A method for organizing and processing information using a computer, said information comprising a plurality of thoughts, and said method comprising the steps of:

defining a matrix comprising the plurality of thoughts and further comprising a plurality of network relationships among the thoughts wherein each thought may be related to at least one other of said thoughts, and wherein at least one of the thoughts is directly related to one of the other thoughts;

displaying an indicium of a first thought as a central thought on a display;

displaying an indicium of a second thought on the display, wherein the second thought having a direct relation to the first thought;

selecting said second thought to be a new central thought, whereby indicia of those thoughts having defined relations with the second thought will be displayed on the display; and creating a file that contains the full location of the computer on which said network is initially defined, said file configured so that said thought documents organized by said network are subsequently accessible from a remote computer having access to the information organized by said network.

7. The method of claim 6, further comprising the steps of:

identifying at least one thought document that does not reside in the memory or storage of a local computer;

copying selected ones of said identified thought documents to a local computer; and changing the recorded location of said copied thought documents to reflect the new local location of said documents.

8. A method for organizing and processing information using a computer, said information comprising a plurality of thoughts, and said method comprising the steps of:

defining a matrix comprising the plurality of thoughts and further comprising a plurality of network relationships among the thoughts, wherein each thought may be related to at least one other of said thoughts, and wherein at least one of the thoughts is directly related to one of the other thoughts, and further comprises the step of setting sharing characteristics of at least one thought document;

displaying an indicium of a first thought as a central thought on a display;

displaying an indicium of a second thought on the display, wherein the second thought having a direct relation to the first thought; and selecting said second thought to be a new central thought, whereby indicia of those thoughts having defined relations with the second thought will be displayed on the display.

9. A method for organizing and processing information using a computer, said information comprising a plurality of thoughts, and said method comprising the steps of:

defining a matrix comprising the plurality of thoughts and further comprising a plurality of network relationships among the thoughts, wherein each thought may be related to at least one other of said thoughts, and wherein at least one of the thoughts is directly related to one of the other thoughts, wherein said network relationships may be forgotten;

displaying an indicium of a first thought as a central thought on a display;

displaying an indicium of a second thought on the display, wherein the second thought having a direct relation to the first thought; and selecting said second thought to be a new central thought, whereby indicia of those thoughts having defined relations with the second thought will be displayed on the display.

10. The method of claim 9 wherein said network relationships may be forgotten automatically in accordance with particular usage statistics.

11. The method of claim 9, wherein the memory of said network relationships is of more than one type, and wherein the user may selectively display the relationships remembered by one or more of said memory types.

12. A method for organizing and processing information using a computer, said information comprising a plurality of thoughts, and said method comprising the steps of:

defining a matrix comprising the plurality of thoughts and further comprising a plurality of network relationships among the thoughts and adding at least one thought to said network by dragging with a pointing device from a thought in a plex to a window associated with said thought document, wherein each thought may be related to at least one other of said thoughts, and wherein at least one of the thoughts is directly related to one of the other thoughts;

displaying an indicium of a first thought as a central thought on a display;

displaying an indicium of a second thought on the display wherein the second thought having a direct relation to the first thought; and selecting said second thought to be a new central thought, whereby indicia of those thoughts having defined relations with the second thought will be displayed on the display.

13. A method for organizing and processing information using a computer said information comprising a plurality of thoughts, and said method comprising the steps of:

defining a matrix comprising the plurality of thoughts and further comprising a plurality of network relationships among the thoughts, wherein each thought may be related to at least one other of said thoughts, and wherein at least one of the thoughts is directly related to one of the other thoughts, and wherein at least one thought contains more than one version of a single document and wherein a user may select from among these multiple versions of said thought when said user interactively designates said current thought or thereafter;

displaying an indicium of a first thought as a central thought on a display;

displaying an indicium of a second thought on the display, wherein the second thought having a direct relation to the first thought; and selecting said second thought to be a new central thought, whereby indicia of those thoughts having defined relations with the second thought will be displayed on the display.

14. A method for organizing and processing information using a computer, said information comprising a plurality of thoughts, and said method comprising the steps of:

defining a matrix comprising the plurality of thoughts and further comprising a plurality of network relationships among the thoughts, wherein each thought maybe related to at least one other of said thoughts, and wherein at least one of the thoughts is directly related to one of the other thoughts:

displaying an indicium of a first thought as a central thought on a display;

displaying an indicium of a second thought on the display, wherein the second thought having a direct relation to the first thought; and selecting said second thought to be a new central thought, whereby indicia of those thoughts having defined relations with the second thought will be displayed on the display in which a Train of Thought is highlighted or otherwise made visible or differentiated from the other graphical elements comprising the graphical representation of said matrix.

15. The method of claim 14, wherein arrows are further used to indicate the order of said Train of Thought.

16. A method for organizing and processing information using a computer, said information comprising a plurality of thoughts, and said method comprising the steps of:

defining a matrix comprising the plurality of thoughts and further comprising a plurality of network relationships among the thoughts, wherein each thought may be related to at least one other of said thoughts, and wherein at least one of the thoughts is directly related to one of the other thoughts, and wherein said matrix references a second matrix;

displaying an indicium of a first thought as a central thought on a display;

displaying an indicium of a second thought on the display, wherein the second thought having a direct relation to the first thought; and selecting said second thought to be a new central thought, whereby indicia of those thoughts having defined relations with the second thought will be displayed on the display.

17. The method of claim 16, wherein an administrator may independently assign access privileges to each of said matrices.

18. A method for organizing and processing information using a computer, said information comprising a plurality of thoughts, and said method comprising the steps of:

defining a matrix comprising the plurality of thoughts and further comprising a plurality of network relationships among the thoughts, wherein each thought may be related to at least one other of said thoughts, and wherein at least one of the thoughts is directly related to one of the other thoughts, and wherein a user can divide a single matrix into one or more individual matrices;

displaying an indicium of a first thought as a central thought on a display;

displaying an indicium of a second thought on the display, wherein the second thought having a direct relation to the first thought; and selecting said second thought to be a new central thought, whereby indicia of those thoughts having defined relations with the second thought will be displayed on the display.

19. A method for organizing and processing information using a computer, said information comprising a plurality of thoughts and said method comprising the steps of:

defining a matrix comprising the plurality of thoughts and further comprising a plurality of network relationships among the thoughts, wherein each thought may be related to at least one other of said thoughts, and wherein at least one of the thoughts is directly related to one of the other thoughts, and further comprising automatically generating a matrix based upon a hierarchical file management structure, wherein said generated matrix may subsequently be modified to incorporate nonhierarchical associations among thoughts;

displaying an indicium of a first thought as a central thought on a display;

displaying an indicium of a second thought on the display, wherein the second thought having a direct relation to the first thought;

selecting said second thought to be a new central thought, whereby indicia of those thoughts having defined relations with the second thought will be displayed on the display.

20. A method for organizing and processing information using a computer, said information comprising a plurality of thoughts, and said method comprising the steps of:

defining a matrix comprising the plurality of thoughts and further comprising a plurality of network relationships among the thoughts, wherein each thought may be related to at least one other of said thoughts and wherein at least one of the thoughts is directly related to one of the other thoughts, and further comprising automatically generating a matrix based upon a preexisting self-referencing network;

displaying an indicium of a first thought as a central thought on a display;

displaying an indicium of a second thought on the display, wherein the second thought having a direct relation to the first thought; and selecting said second thought to be a new central thought, whereby indicia of those thoughts having defined relations with the second thought will be displayed on the display.

21. The method of claim 20, wherein said generated matrix may subsequently be modified to incorporate nonhierarchical associations among thoughts.

22. The method of claim 20, wherein said self-referencing network comprises the Internet.

23. The method of claim 20, wherein said self-referencing network comprises a hypertext document.

24. A method for organizing and processing information using a computer, said information comprising a plurality of thoughts, and said method comprising the steps of:

defining a matrix comprising the plurality of thoughts and further comprising a plurality of network relationships among the thoughts and is performed, in whole or in part, automatically in response to a user's serial selection of files or Internet browsing, wherein each thought may be related to at least one other of said thoughts, and wherein at least one of the thoughts is directly related to one of the other thoughts;

displaying an indicium of a first thought as a central thought on a display;

displaying an indicium of a second thought on the display, wherein the second thought having a direct relation to the first thought; and selecting said second thought to be a new central thought, whereby indicia of those thoughts having defined relations with the second thought will be displayed on the display.

25. A method for organizing and processing information using a computer, said information comprising a plurality of thoughts, and said method comprising the steps of:

defining a matrix comprising the plurality of thoughts and further comprising a plurality of network relationships among the thoughts and is performed, in whole or in part, automatically based upon the results of a database search, wherein each thought may be related to at least one other of said thoughts, and wherein at least one of the thoughts is directly related to one of the other thoughts;

displaying an indicium of a first thought as a central thought on a display;

displaying an indicium of a second thought on said display, the second thought having a direct relation to the first thought; and selecting said second thought to be a new central thought, whereby indicia of those thoughts having defined relations with the second thought will be displayed on the display.

26. The method of claim 25 wherein said database represents an index of content on the Internet.

27. The method of claim 20 wherein the step of automatically generating is performed in accordance with a web crawling technique and in which the self-referencing network comprises at least one site on the World Wide Web.

28. A method for organizing and processing information using a computer, said information comprising a plurality of thoughts, and said method comprising the steps of:

defining a matrix comprising the plurality of thoughts and further comprising a plurality of network relationships among the thoughts, wherein each thought may be related to at least one other of said thoughts, and wherein at least one of the thoughts is directly related to one of the other thoughts;

displaying an indicium of a first thought as a central thought on a display;

displaying an indicium of a second thought on the display, wherein the second thought having a direct relation to the first thought;

selecting said second thought to be a new central thought, whereby indicia of those thoughts having defined relations with the second thought will be displayed on the display; and wherein at least one file having information associated with a thought resides remotely on a server device, and wherein said user accesses said matrix from a client device.

29. The method of claim 28, further comprising the steps of:

based upon the current thought and the defined matrix relationships, identifying all thoughts that could possibly be selected as a new central thought from a current plex, and all thoughts that would join said new central thought in the resulting new plex upon the selection of any one of said thoughts;

identifying the thoughts for which the desired information is presently stored at the client location; and sending from the server only that data associated with each thought that could join the plex upon the selection of a new central thought that is not already stored at the client location.

30. The method of claim 29, wherein the results of at least one of said steps of identifying are stored in a ThoughtList.

31. The method of claim 3 wherein files containing said viewed, edited, or processed information are saved automatically without user interaction upon the deactivation of their associated thought.

32. A method for organizing and processing information using a computer, said information comprising a plurality of thoughts, and said method comprising the steps of:

defining a matrix comprising the plurality of thoughts and further comprising a plurality of network relationships among the thoughts, wherein each thought may be related to at least one other of said thoughts, and wherein at least one of the thoughts is directly related to one of the other thoughts;

displaying an indicium of a first thought as a central thought on a display;

displaying an indicium of a second thought on the display, wherein the second thought having a direct relation to the first thought;

selecting said second thought to be a new central thought, whereby indicia of those thoughts having defined relations with the second thought will be displayed on the display; and maintaining a list of parentless thoughts so that it is unnecessary to ensure that each thought has a relationship with at least one other thought.

33. The method of claim 9 wherein all thoughts childward of a first forgotten thought and not having parent relations to any thought other than to a forgotten thought are themselves automatically forgotten.

34. A method for organizing and processing information using a computer, said information comprising a plurality of thoughts, and said method comprising the steps of:

defining a matrix comprising the plurality of thoughts and further comprising a plurality of network relationships among the thoughts, wherein each thought may be related to at least one other of said thoughts, and wherein at least one of the thoughts is directly related to one of the other thoughts;

displaying an indicium of a first thought as a central thought on a display;

displaying an indicium of a second thought on the display, wherein the second thought having a direct relation to the first thought;

selecting said second thought to be a new central thought, whereby indicia of those thoughts having defined relations with the second thought will be displayed on the display; and enabling the entry of notes relating to at least one thought, wherein said notes are automatically loaded and saved upon the activation and deactivation of the thought to which said notes correspond.

35. The method of claim 34 wherein said notes are entered by a word processor that links at least one OLE or similar object.

36. A method for organizing and processing information using a computer, said information comprising a plurality of thoughts and said method comprising the steps of:

defining a matrix comprising the plurality of thoughts and further comprising a plurality of network relationships among the thoughts, wherein at least one of said thoughts is related to one of the other thoughts;

displaying a graphical representation of the matrix, the graphical representation comprising a plurality of display icons corresponding to the thoughts, and further comprising a plurality of connecting lines corresponding to the relationships among the thoughts;

receiving a communication from an application program;

automatically identifying at least one command within said communication, said command a request to make a particular thought the current thought; and viewing, editing or processing information associated with said current thought.

* * * * *